US010602072B2

(12) United States Patent
Tamura

(10) Patent No.: US 10,602,072 B2
(45) Date of Patent: Mar. 24, 2020

(54) IMAGING APPARATUS AND METHOD FOR CONTROLLING THE SAME

(71) Applicant: FUJIFILM Corporation, Tokyo (JP)

(72) Inventor: Kazunori Tamura, Saitama (JP)

(73) Assignee: FUJIFILM Corporation, Tokyo (JP)

(*) Notice: Subject to any disclaimer, the term of this patent is extended or adjusted under 35 U.S.C. 154(b) by 25 days.

(21) Appl. No.: 16/046,726

(22) Filed: Jul. 26, 2018

(65) Prior Publication Data
US 2018/0332208 A1 Nov. 15, 2018

Related U.S. Application Data

(63) Continuation of application No. PCT/JP2017/002350, filed on Jan. 24, 2017.

(30) Foreign Application Priority Data

Jan. 27, 2016 (JP) ................................. 2016-013687

(51) Int. Cl.
H04N 5/235 (2006.01)
G03B 15/05 (2006.01)
(Continued)

(52) U.S. Cl.
CPC ........... *H04N 5/2352* (2013.01); *G03B 7/003* (2013.01); *G03B 7/17* (2015.01); *G03B 9/40* (2013.01);
(Continued)

(58) Field of Classification Search
CPC .... H04N 5/2352; H04N 5/232; H04N 5/2354; H04N 5/23216; H04N 5/2256;
(Continued)

(56) References Cited

U.S. PATENT DOCUMENTS

2009/0136224 A1* 5/2009 Aoyagi .................. G03B 15/05
396/157
2015/0373249 A1* 12/2015 Ariga ................... H04N 5/2357
348/226.1

FOREIGN PATENT DOCUMENTS

JP 5-196995 A 8/1993
JP 2001-337375 A 12/2001
(Continued)

OTHER PUBLICATIONS

International Preliminary Report on Patentability and English translation of Written Opinion of the International Searching Authority, issued in PCT/JP2017/002350, dated Jul. 31, 2018 (Forms PCT/IB/373 and PCT/ISA/237).

Primary Examiner — Mekonnen D Dagnew
(74) Attorney, Agent, or Firm — Birch, Stewart, Kolasch & Birch, LLP

(57) ABSTRACT

An imaging system includes a digital camera and illuminating devices. The digital camera includes an imaging optical system, a shutter, a shutter driving mechanism, an imaging element, an illumination control unit, and a wireless I/F. The shutter is a focal-plane shutter. In a case in which a main imaging operation is performed in a plural illumination control mode, the shutter driving mechanism drives the shutter to generate a transition period for which a partial exposure region is transferred to the lower side of an imaging area of the imaging element over time. The illumination control unit controls the emission times of the illuminating devices to be different times within the transition period.

10 Claims, 20 Drawing Sheets

(51) Int. Cl.
| | |
|---|---|
| *G03B 15/07* | (2006.01) |
| *G03B 7/17* | (2014.01) |
| *G03B 9/42* | (2006.01) |
| *H04N 5/232* | (2006.01) |
| *G03B 7/00* | (2014.01) |
| *G03B 9/40* | (2006.01) |
| *G03B 9/60* | (2006.01) |
| *G03B 17/20* | (2006.01) |
| *H04N 5/225* | (2006.01) |

(52) U.S. Cl.
CPC ............... *G03B 9/42* (2013.01); *G03B 9/60* (2013.01); *G03B 15/05* (2013.01); *G03B 15/07* (2013.01); *G03B 17/20* (2013.01); *H04N 5/2256* (2013.01); *H04N 5/232* (2013.01); *H04N 5/2354* (2013.01); *H04N 5/23216* (2013.01); *H04N 5/232935* (2018.08); *G03B 2215/0503* (2013.01); *G03B 2215/0557* (2013.01)

(58) Field of Classification Search
CPC .... H04N 5/232935; G03B 7/003; G03B 9/42; G03B 7/17; G03B 17/20; G03B 9/60; G03B 9/40; G03B 15/07; G03B 15/05; G03B 2215/0557; G03B 2215/0503
See application file for complete search history.

(56) References Cited

FOREIGN PATENT DOCUMENTS

| JP | 2005-338279 A | 12/2005 |
|---|---|---|
| JP | 2009-55491 A | 3/2009 |
| JP | 2012-517624 A | 8/2012 |
| JP | 2015-34862 A | 2/2015 |

\* cited by examiner

FIG. 4
(A)
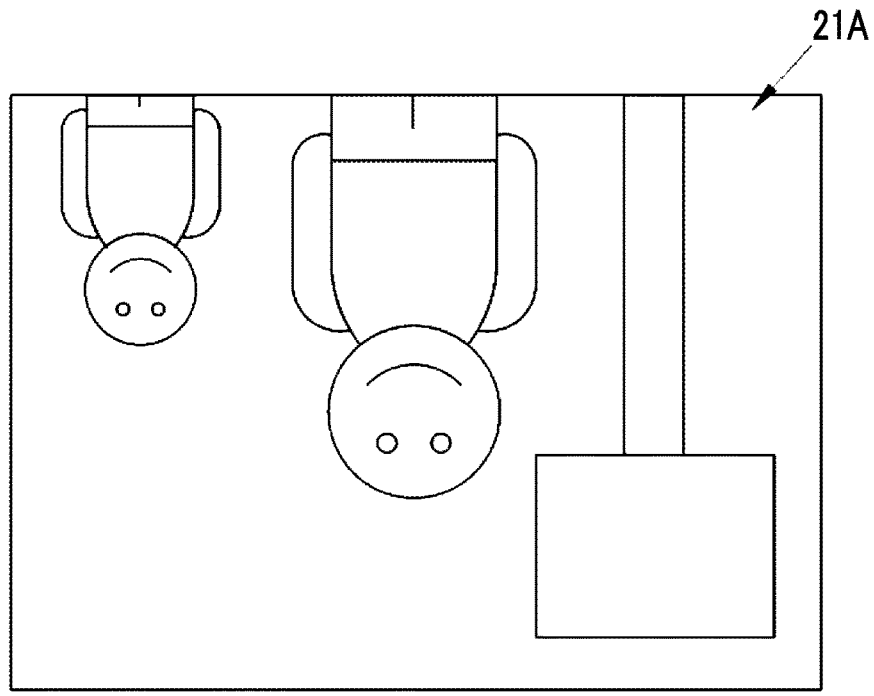
(B)
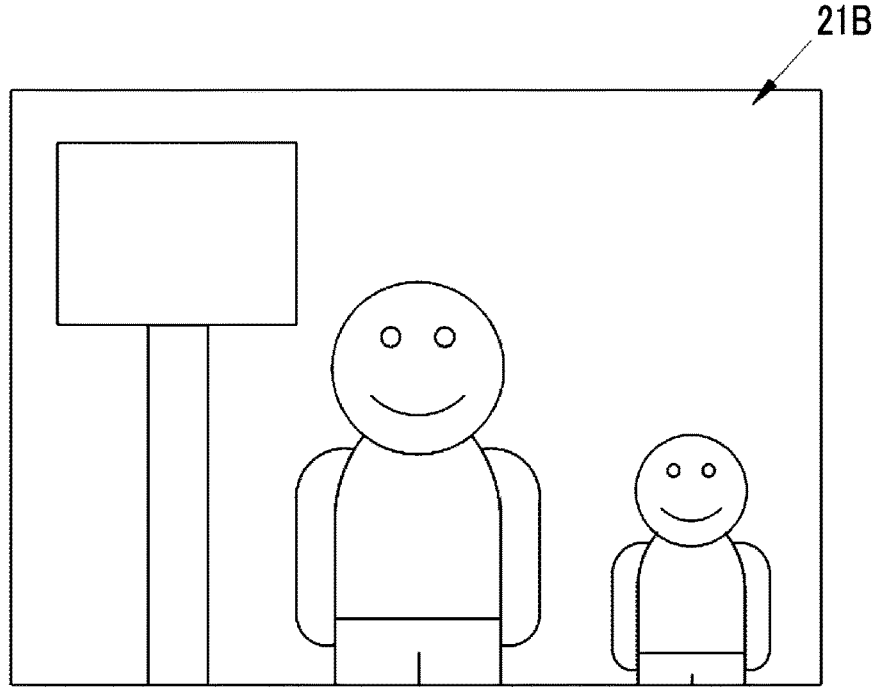

FIG. 10
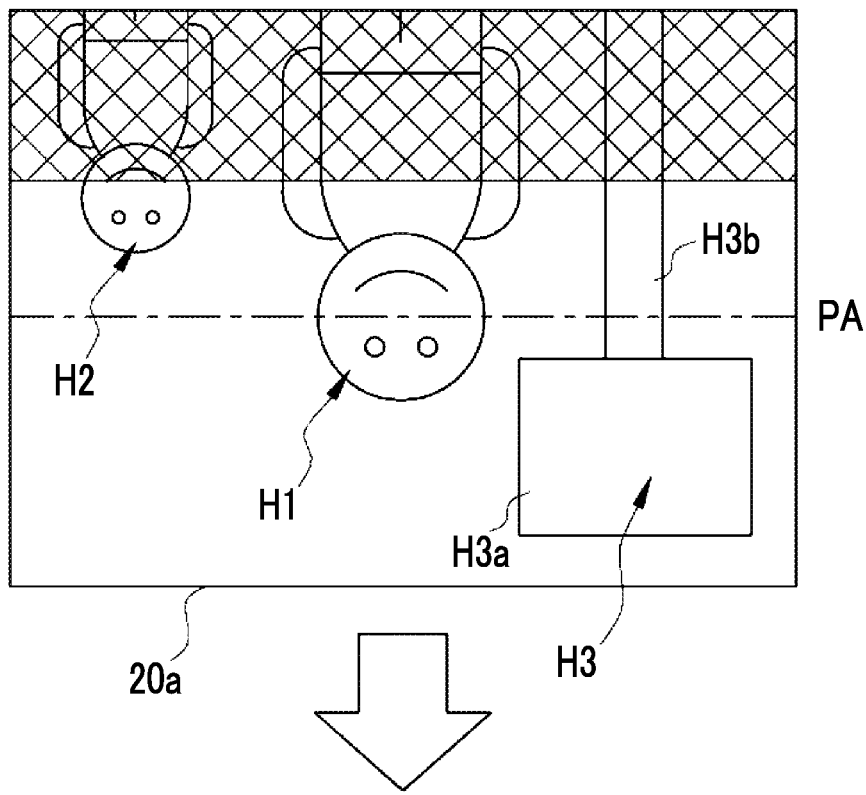
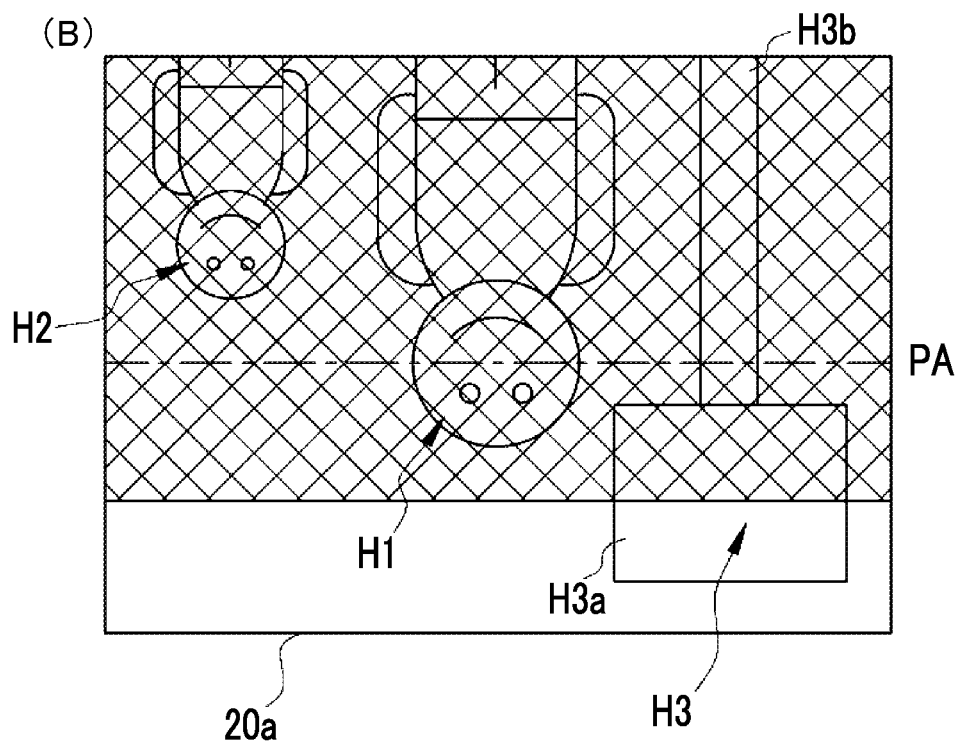

FIG. 11
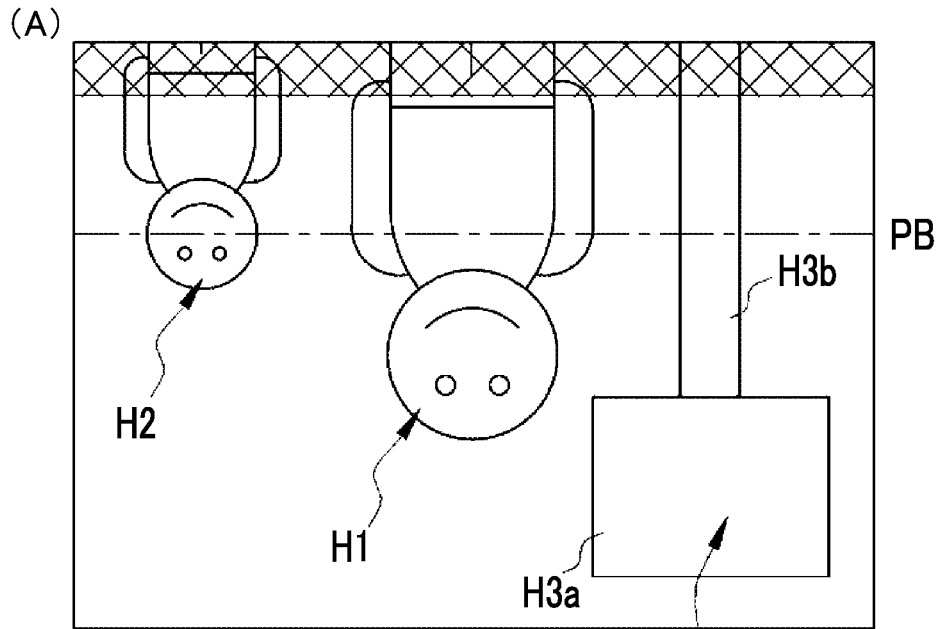
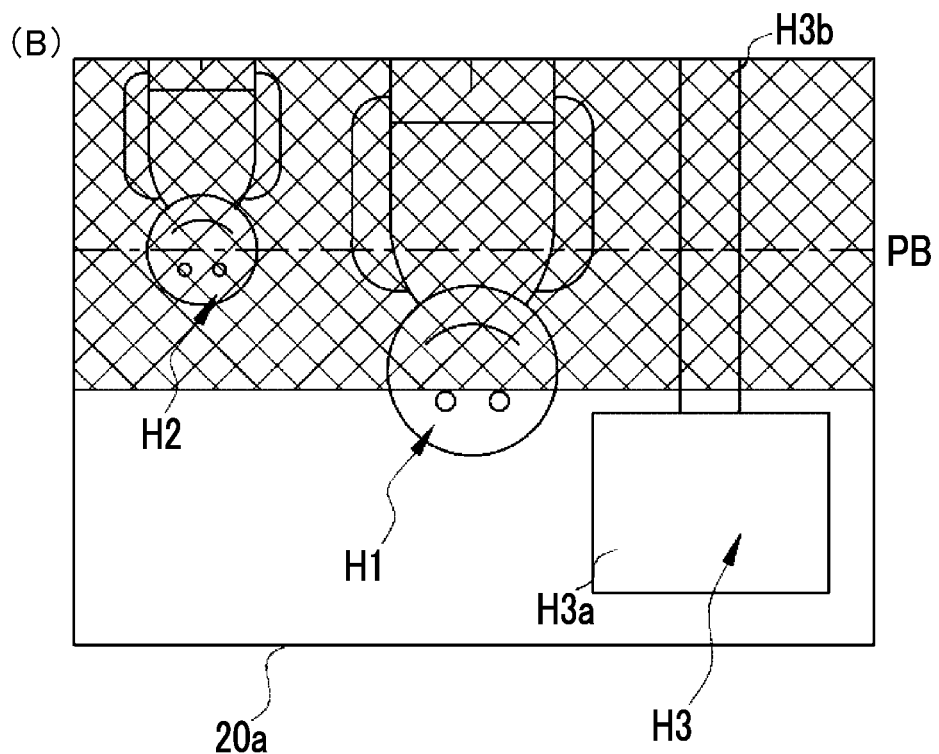

FIG. 17
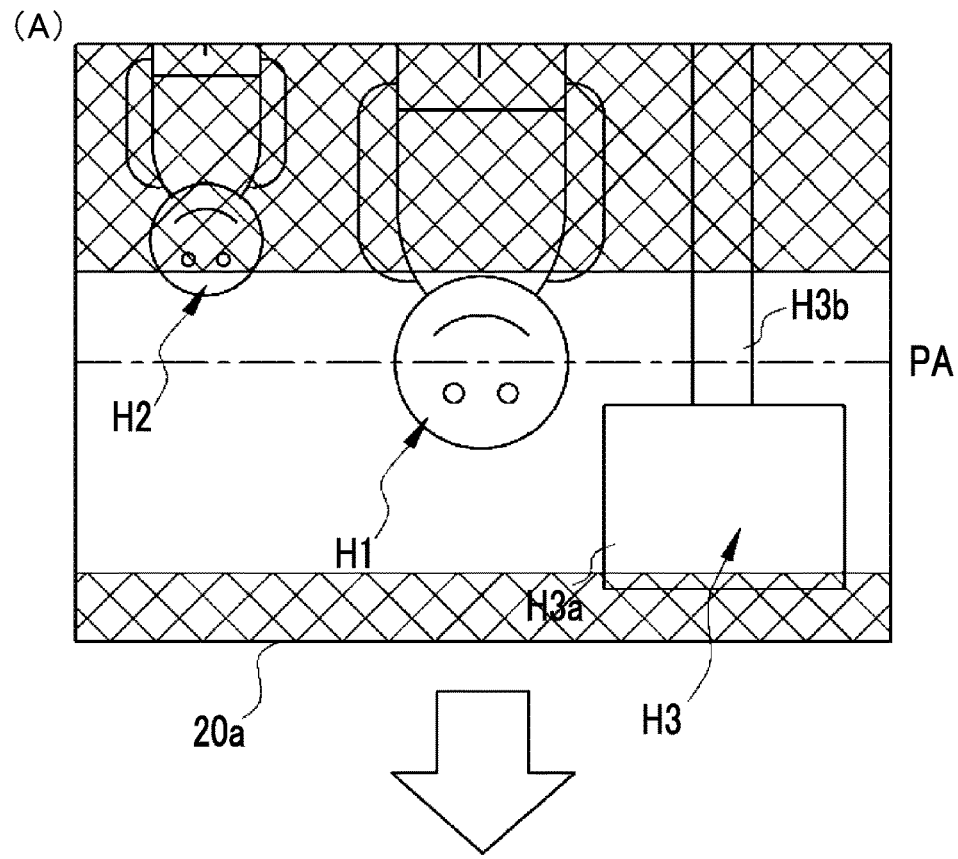
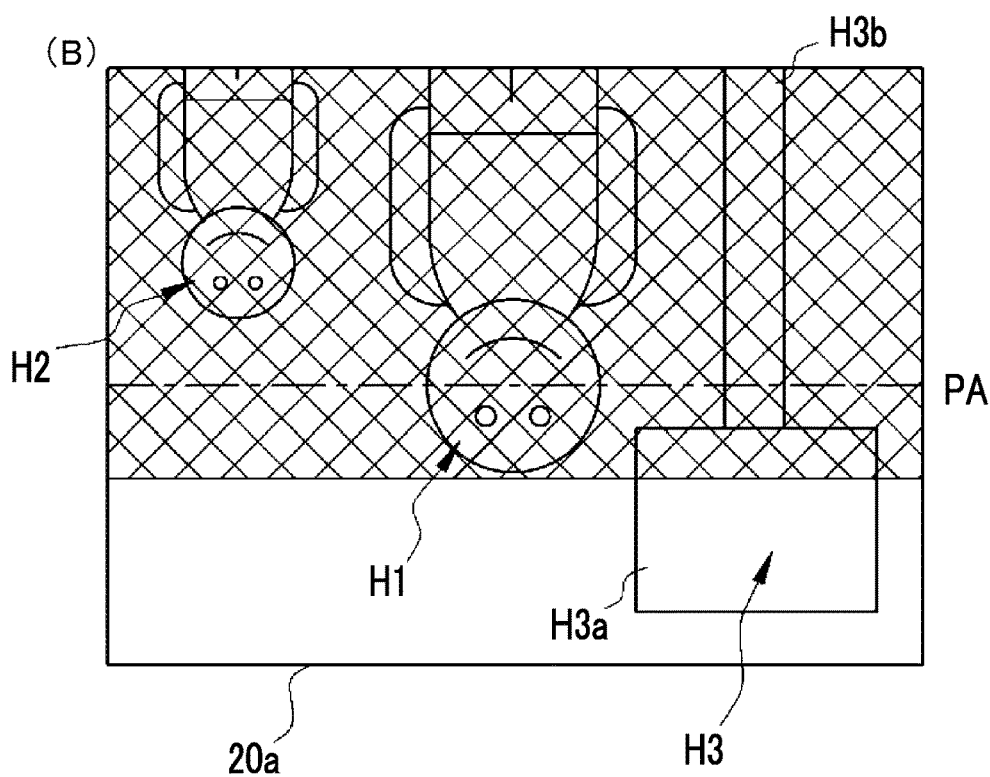

FIG. 18
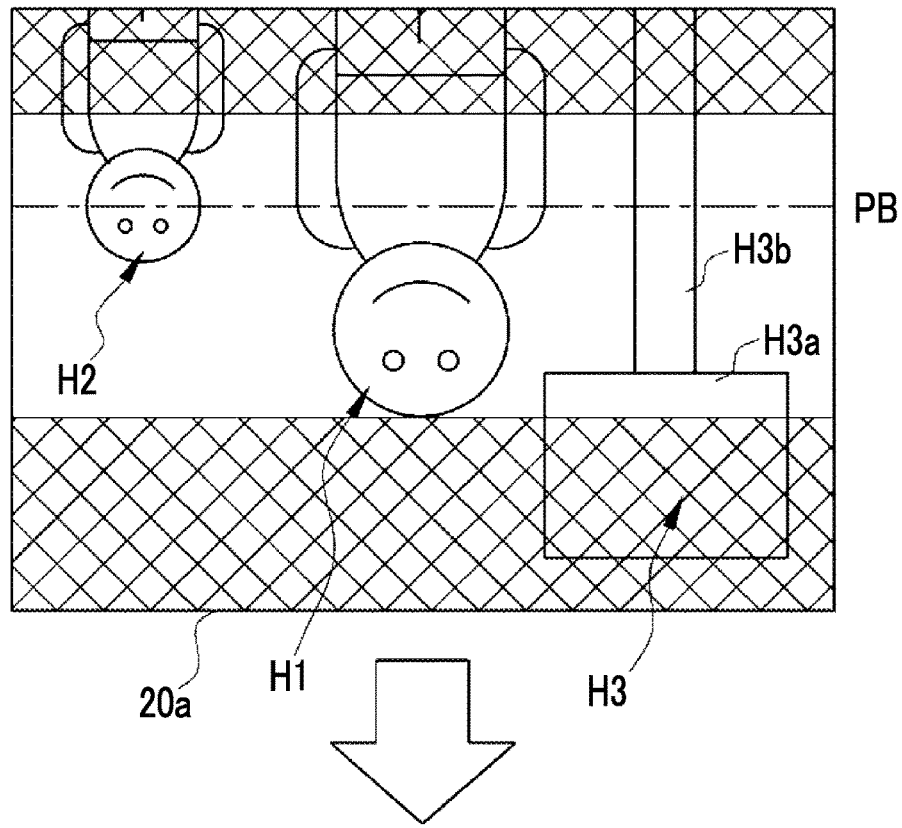
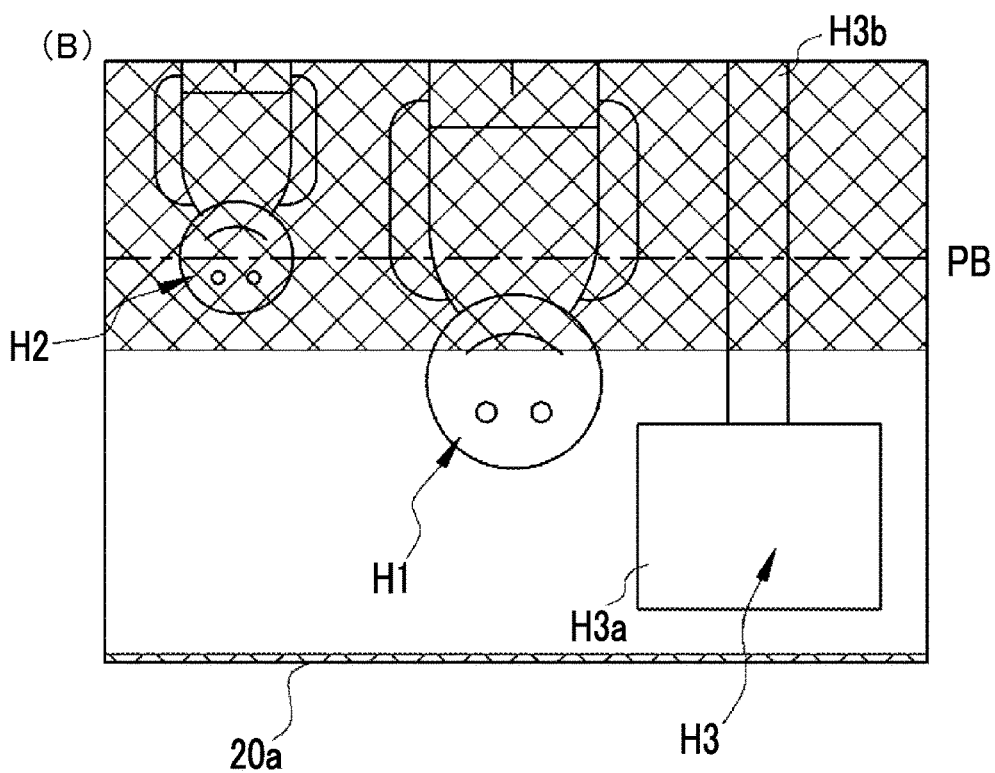

FIG. 19
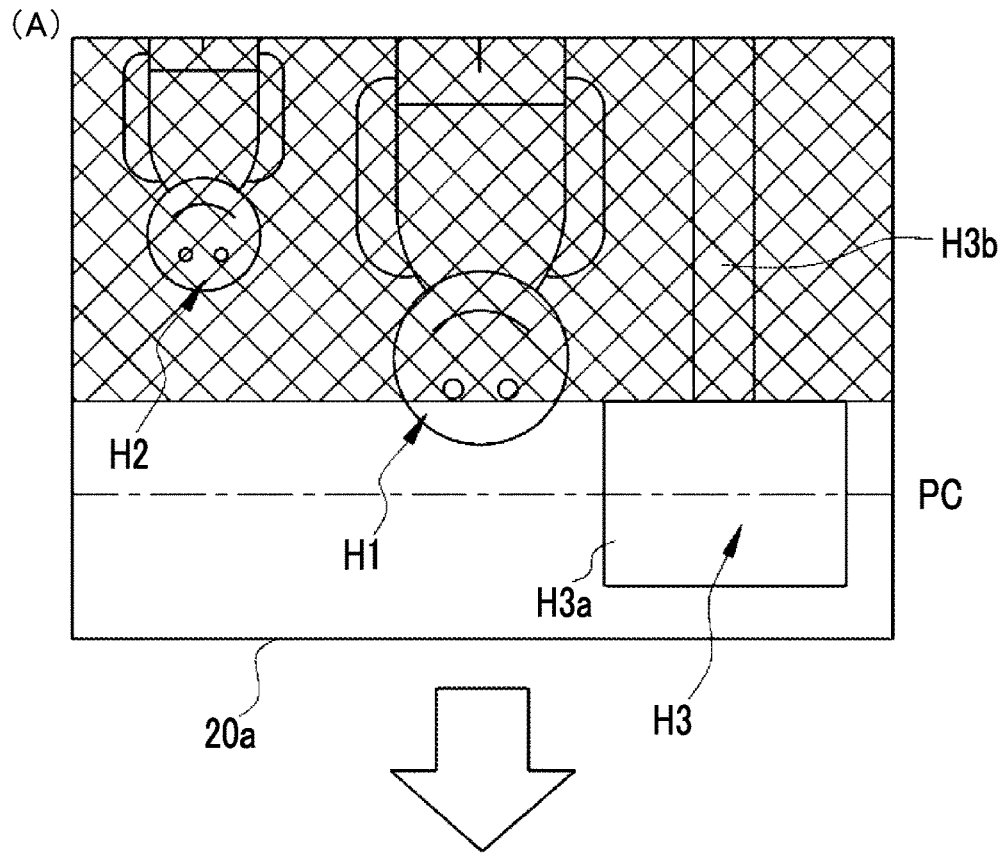
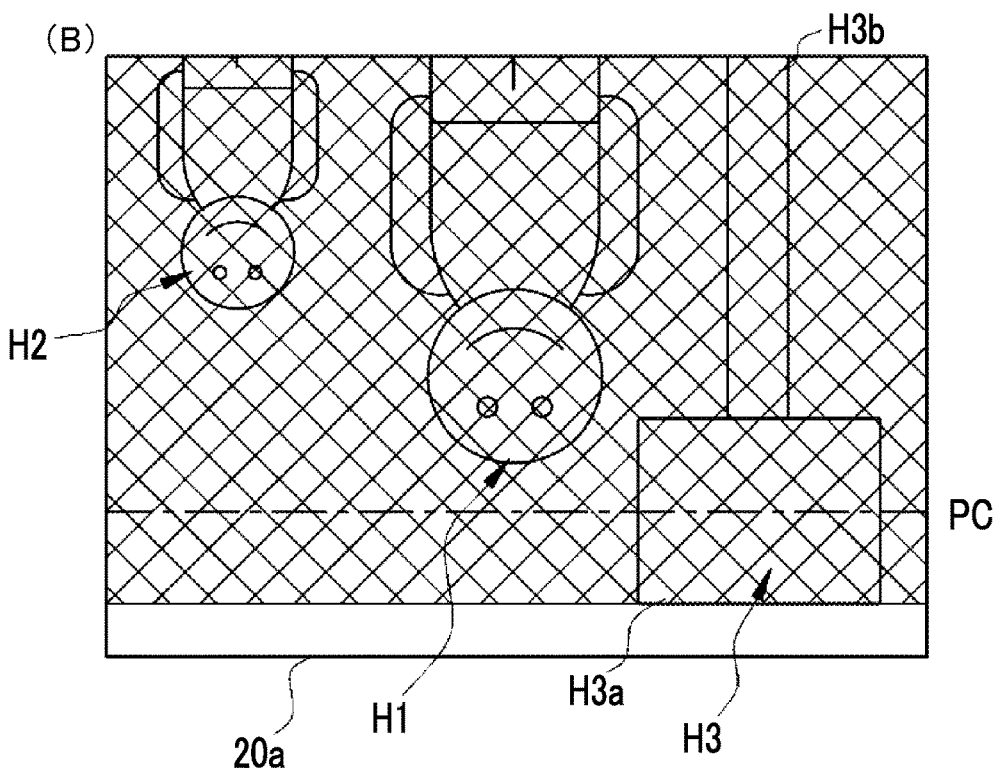

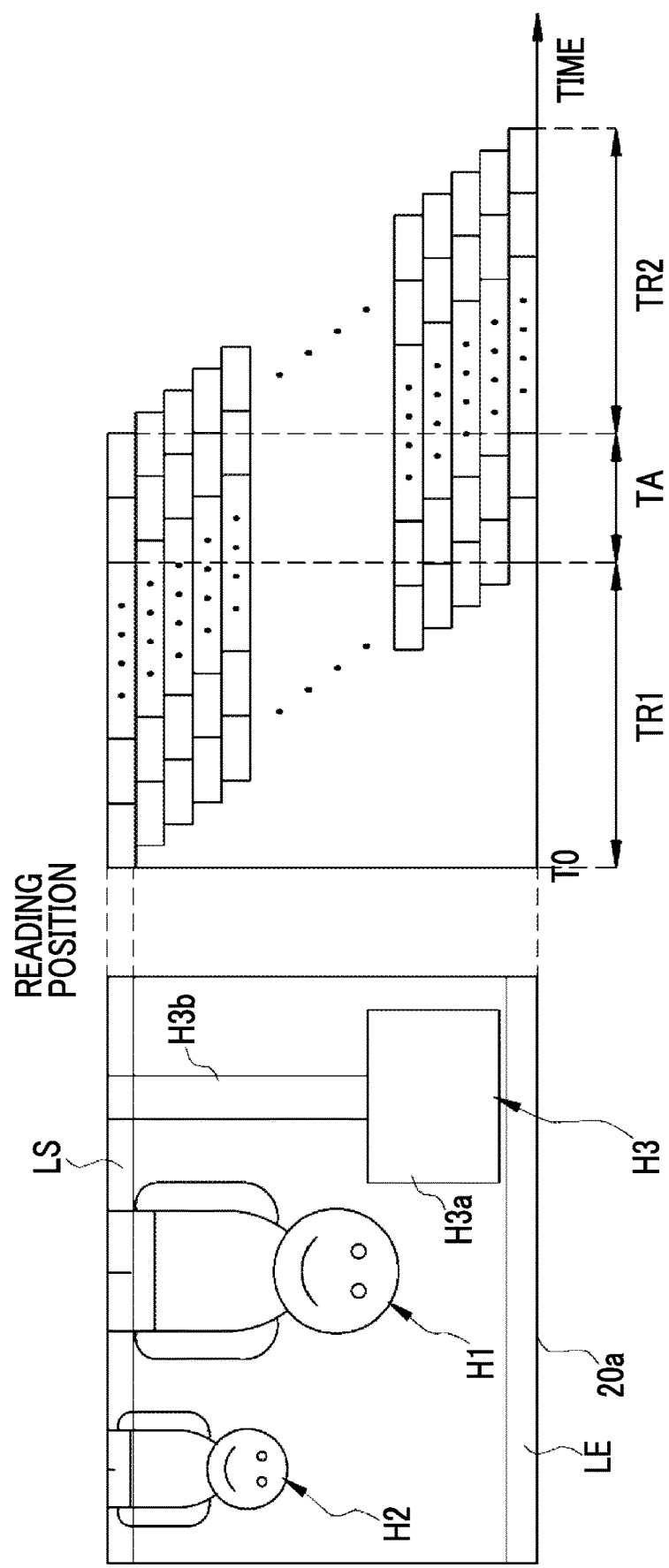

IMAGING APPARATUS AND METHOD FOR CONTROLLING THE SAME

CROSS-REFERENCE TO RELATED APPLICATIONS

This application is a Continuation of PCT International Application No. PCT/JP2017/002350 filed on 24 Jan. 2017, which claims priority under 35 U.S.C § 119(a) to Japanese Patent Application No. 2016-013687 filed on 27 Jan. 2016. The above application is hereby expressly incorporated by reference, in its entirety, into the present application.

BACKGROUND OF THE INVENTION

1. Field of the Invention

The present invention relates to an imaging apparatus that controls a plurality of illuminating devices and captures an image and a method for controlling the imaging apparatus.

2. Description of the Related Art

Some imaging apparatuses, such as digital cameras, include a focal-plane shutter for controlling an exposure period of an imaging element. The focal-plane shutter is provided on front of a lens-side surface of an imaging area of the imaging element and includes, for example, a front curtain and a rear curtain that are movable in the up-down direction of the imaging area. In one shutter operation, first, the front curtain starts to move from a fully closed position where the entire imaging area is shielded and an exposure region of the imaging area increases gradually according to the movement position of the front curtain. Then, the front curtain moves to a fully open position where the entire imaging area is the exposure region. After the front curtain reaches the fully open position, the rear curtain starts to operate and the exposure region of the imaging area is gradually reduced according to the movement position of the rear curtain. Then, the rear curtain reaches the fully closed position.

In the imaging apparatus including the focal-plane shutter, the time of the fully open position is controlled to control the exposure period. In addition, the emission time of a strobe device is controlled according to the fully open position such that a uniform amount of light is incident on the entire imaging area (JP2009-55491A and JP1993-196995A (JP-H05-196995A)).

SUMMARY OF THE INVENTION

In a studio in which identification photographs or commemorative images are taken, in many cases, imaging is performed using, as illuminating devices, a plurality of illuminating devices that are provided independently of an imaging apparatus in addition to a strobe device that is attached to the imaging apparatus. In plural illumination imaging using a plurality of illuminating devices, exposure control is generally performed such that the fully open position of the focal-plane shutter is synchronized with the emission time of each illuminating device.

However, in the plural illumination imaging, for example, in some cases, the irradiation area of each illuminating device is adjusted such that the irradiation area of an illuminating device is only an upper portion of the imaging range and the irradiation area of another illuminating device is only a lower portion of the imaging range. The adjustment of the irradiation area of each illuminating device makes it possible to perform appropriate lighting intended by a photographer. For example, the arrangement of the illuminating devices, an irradiation angle, and the distance to the object need to be adjusted in order to adjust the irradiation areas.

However, it takes a lot of time and effort to adjust, for example, the arrangement of a plurality of illuminating devices, the irradiation angle, and the distance. In particular, in a case in which there are a large number of illuminating devices, the time and effort increase significantly. For this reason, there are attempts to solve the problems.

The invention has been made in view of the above-mentioned problems and an object of the invention is to provide an imaging apparatus that can reduce the time and effort required to adjust an irradiation area of each illuminating device in plural illumination imaging and a method for controlling the imaging apparatus.

In order to achieve the object, an imaging apparatus according to the invention comprises an imaging element, a shutter, and an illumination control unit. The imaging element has an imaging area for capturing an image of an object. The shutter generates a transition period for which a partial exposure region that is partially exposed in the imaging area is transferred over time in one direction from one end to the other end of the imaging area. In a case in which at least first and second illuminating devices that irradiate the object with illumination light are provided, the illumination control unit controls first and second emission times of the first and second illuminating devices and controls the first and second emission times to be different times within the transition period.

Preferably, the shutter is a focal-plane shutter that is provided separately from the imaging element. Preferably, the shutter comprises a shutter front curtain and a shutter rear curtain that travel from the one end to the other end of the imaging area. Preferably, the transition period is a first traveling period for which the shutter front curtain travels from a fully closed position where the entire imaging area is shielded to a fully open position where the entire imaging area is exposed and a second traveling period for which the shutter rear curtain travels from the fully open position where the entire imaging area is exposed to the fully closed position where the entire imaging area is shielded. Preferably, the illumination control unit controls the first and second emission times to be different times within the first traveling period or the second traveling period.

Preferably, in a case in which the imaging element is a CMOS image sensor, the shutter is an image reading unit that controls the imaging element such that an image signal is read by a rolling shutter method. Preferably, the shutter performs control such that charge accumulation and reading are sequentially performed from a line at the one end to a line at the other end of the imaging area. Preferably, the transition period is a reading start period from a start of the charge accumulation and reading for the line at the one end to a start of the charge accumulation and reading for the line at the other end of the imaging area and a reading end period from an end of the charge accumulation and reading for the line at the one end to an end of the charge accumulation and reading for the line at the other end of the imaging area. Preferably, the illumination control unit controls the first and second emission times to be different times within the reading start period or the reading end period.

Preferably, the shutter has a function of changing the transition period for which the partial exposure region is transferred.

Preferably, the first and second illuminating devices include at least one of a built-in strobe device that is provided in an imaging apparatus body, an external strobe device that is attached to the imaging apparatus body, or an independent illuminating device that is independent of the imaging apparatus.

Preferably, the imaging apparatus further comprises a pre-image acquisition unit, an image display unit, an operation input receiving unit, and an emission time determination unit. The pre-image acquisition unit directs the imaging element to perform a pre-imaging operation for capturing the image of the object in a state in which the first illuminating device or the second illuminating device emits light before a main imaging operation and acquires a pre-image. The image display unit displays the pre-image. The operation input receiving unit receives an input of an operation of designating any designated position of the pre-image in a state in which the pre-image is displayed on the image display unit. The emission time determination unit determines the first and second emission times on the basis of the designated position designated by the operation input.

Preferably, the operation input receiving unit is a touch panel that is provided so as to be stacked on the image display unit and is configured such that a touch operation is performed in a state in which the pre-image is displayed on the image display unit to designate the designated position.

According to the invention, there is provided a method for controlling an imaging apparatus. The method comprises: a transition period generation step of allowing a shutter to generate a transition period; an illumination control step of allowing an illumination control unit to control first and second emission times to be different times within the transition period; and an imaging step of allowing an imaging element to capture an image of an object during the illumination control step.

According to the invention, it is possible to provide an imaging apparatus that can reduce the amount of work for adjusting an irradiation area of each illuminating device in plural illumination imaging and a method for controlling the imaging apparatus.

BRIEF DESCRIPTION OF THE DRAWINGS

FIG. 4 is a diagram illustrating the generation of captured image data from the capture of an inverted image.

FIG. 10 is a diagram illustrating an example of a partial exposure region when an emission period of the illuminating device A starts and ends in a first embodiment.

FIG. 11 is a diagram illustrating an example of a partial exposure region when an emission period of the illuminating device B starts and ends in the first embodiment.

FIG. 17 is a diagram illustrating a partial exposure region when an emission period of the illuminating device A starts and ends in the second embodiment.

FIG. 18 is a diagram illustrating a partial exposure region when an emission period of the illuminating device B starts and ends in the second embodiment.

FIG. 19 is a diagram illustrating a partial exposure region when an emission period of the illuminating device C starts and ends in the second embodiment.

FIG. 22 is a timing chart illustrating the operation of the image reading unit in a case in which imaging is performed by the configuration of a digital camera illustrated in FIG. 21.

DESCRIPTION OF THE PREFERRED EMBODIMENTS

First Embodiment

Figure 1:
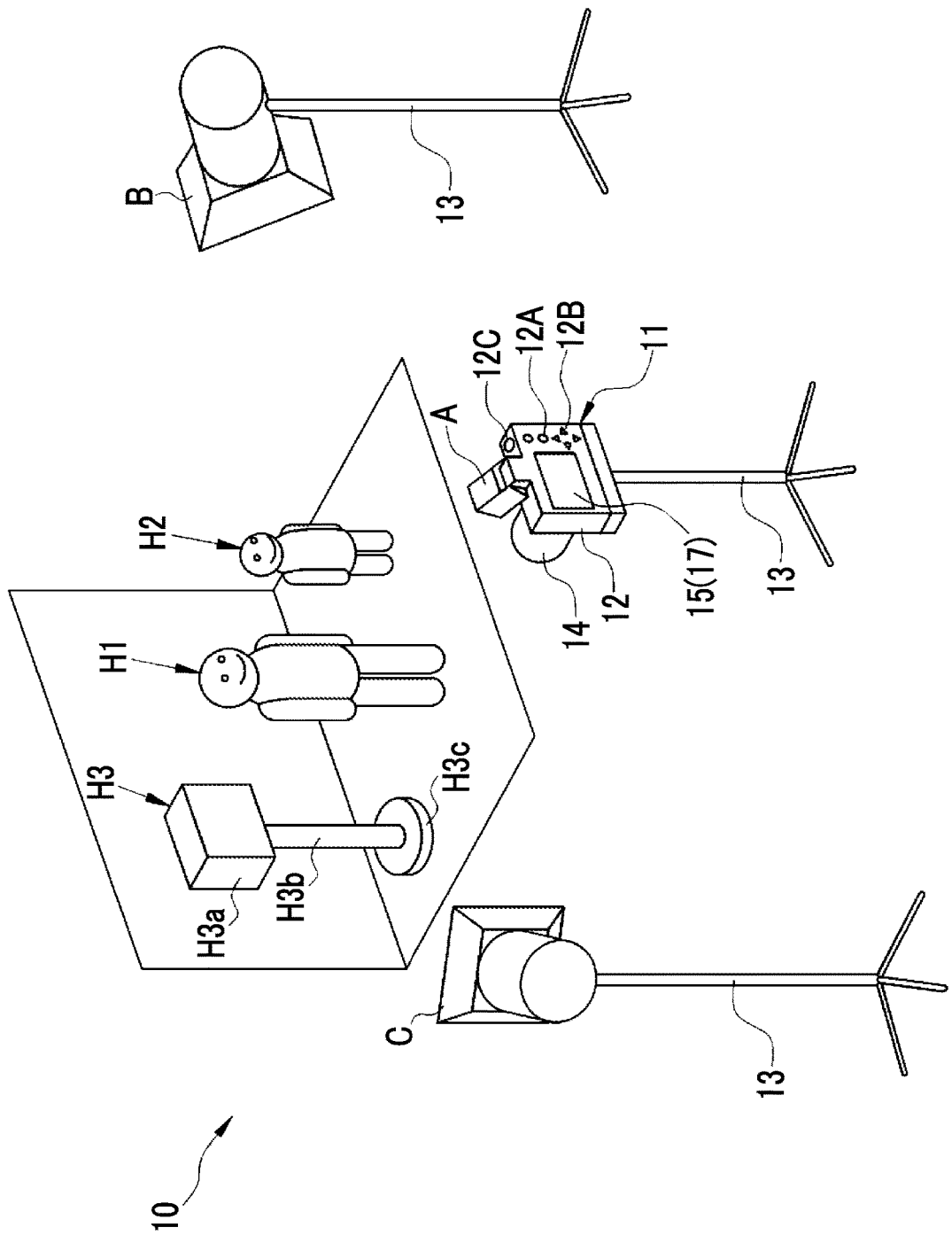
FIG. 1 is a perspective view illustrating an imaging system including an imaging apparatus and a plurality of illuminating devices A to C.

An imaging system 10 illustrated in FIG. 1 is used to capture images in a studio in which identification photographs or commemorative images are taken. The imaging system 10 includes a digital camera 11 which is an imaging apparatus and a plurality of illuminating devices A to C. The illuminating devices A to C correspond to at least two illuminating devices, that is, first and second illuminating devices in the claims. In this example, three illuminating devices, that is, the first to third illuminating devices are provided. However, three or more illuminating devices may be provided.

The digital camera 11 has a camera body 12 in which the illuminating device A which is a built-in strobe device is provided. The illuminating devices B and C are independent illuminating devices that are independent of the digital camera 11 and are independent strobe devices in this embodiment. The digital camera 11 and the illuminating devices B and C are provided while being supported by stands 13.

The camera body 12 is provided with a power button 12A for turning on and off the digital camera, a mode switching button 12B for switching an operation mode, and a shutter button 12C. The shutter button 12C has a two-step stroke switch (not illustrated) and is used for a shutter operation. In a case in which the shutter button 12C is pressed (halfway), the digital camera 11 performs an imaging preparation operation such as an auto focus operation. In a case in which the shutter button 12C is further pressed (fully) from this state, the digital camera 11 performs an imaging operation.

In this embodiment, three objects H1 to H3 are disposed in an imaging range of the digital camera 11 and imaging is performed. The illuminating devices A to C irradiate the objects H1 to H3 with illumination light. For example, the objects H1 and H2 are persons and the object H3 is an artifact. In addition, the object H2 is shorter than the object H1. The object H3 includes a sign H3a that has a rectangular parallelepiped shape and is provided at a position higher than the object H2, a column H3b that is provided below the sign, and a base H3c that is provided below the column H3b.

The digital camera 11 includes a lens barrel 14 and a rear display unit (image display unit) 15. The lens barrel 14 is provided on the front surface of the camera body 12 and holds an imaging optical system 16 (see FIG. 2).

The rear display unit 15 is provided on the rear surface of the camera body 12 and displays images acquired in various imaging modes and a menu screen for performing various settings. A touch panel 17 is provided so as to be stacked on the surface of the rear display unit 15 and an input command from the touch panel 17 is transmitted to a main control unit 22 (see FIG. 2).

Figure 2:
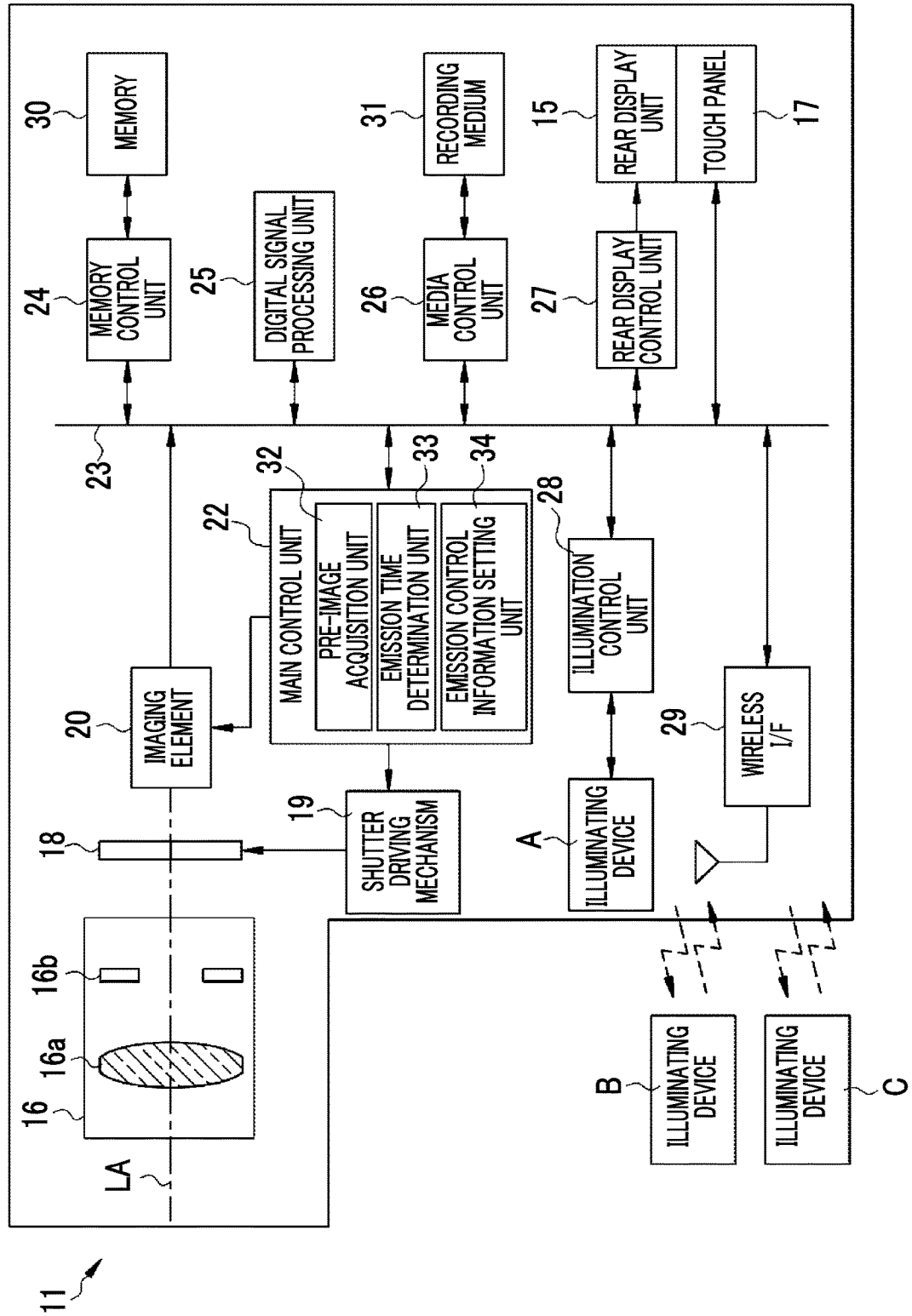
FIG. 2 is a block diagram illustrating the configuration of a digital camera.

As illustrated in FIG. 2, the imaging optical system 16 includes, for example, a plurality of lenses 16a and a stop 16b. A shutter 18 and an imaging element 20 are provided in this order behind the imaging optical system 16 along an optical axis LA of the imaging optical system 16. The driving of the shutter 18 is controlled by a shutter driving mechanism 19.

The imaging element 20 is provided in the camera body 12 and the driving of the imaging element 20 is controlled by the main control unit 22. The imaging element 20 is, for example, a charge-coupled device (CCD) image sensor of an all-pixel simultaneous reading type and has an imaging area 20a (see FIGS. 3(A) to 3(E)) including a plurality of pixels (not illustrated) that are arranged in a two-dimensional matrix. Each pixel includes a photoelectric conversion element and performs photoelectric conversion for an object image formed in the imaging area 20a by the imaging optical system 16 to generate an imaging signal.

As illustrated in FIG. 3(A), the shutter 18 is a focal-plane shutter that is provided separately from the imaging element 20 and is located in front of the imaging element 20. The shutter 18 includes a shutter front curtain 18a and a shutter rear curtain 18b and is a type in which both the shutter front curtain 18a and the shutter rear curtain 18b travel from the top to the bottom of the imaging area 20a. In a case in which the shutter 18 is driven by the shutter driving mechanism 19, first, the shutter front curtain 18a and the shutter rear curtain 18b are held in the upper part of the imaging area 20a by shutter charge as illustrated in FIG. 3(A). In this case, the shutter front curtain 18a is at a pre-traveling position S1 (fully closed position) where it shields the entire imaging area 20a.

After shutter charge, as illustrated in FIG. 3(B), the shutter front curtain 18a starts to travel downward from the pre-traveling position S1 and the exposure of the imaging area 20a of the imaging element 20 starts. While the shutter front curtain 18a is traveling downward, an exposure region of the imaging area 20a increases gradually according to the traveling position of the shutter front curtain 18a. A first traveling period for which the shutter front curtain 18a travels is a transition period for which a partial exposure region that is partially exposed in the imaging area 20a is transferred downward over time. The transition period is generated by the driving of the shutter 18.

In a case in which a shutter fully open period is present, as illustrated in FIG. 3(C), the shutter front curtain 18a travels to a post-traveling position S2 (fully open position) where the entire imaging area 20a of the imaging element 20 is exposed on the basis of a predetermined shutter speed while the shutter rear curtain 18b is maintained in a stationary state. After the shutter fully open period elapses, the shutter rear curtain 18b starts to travel downward from the pre-traveling position S1 (fully open position) as illustrated in FIG. 3(D).

In a case in which the shutter fully open period is absent, the shutter rear curtain 18b starts to travel downward before the shutter front curtain 18a reaches the post-traveling position S2 (fully open position). While the shutter rear curtain 18b is traveling downward, the exposure region of the imaging area 20a is gradually reduced according to the traveling position of the shutter rear curtain 18b. A second traveling period for which the shutter rear curtain 18b travels is a transition period for which the partial exposure region that is partially exposed in the imaging area 20a is transferred downward over time. The transition period is generated by the driving of the shutter 18.

In a case in which the shutter rear curtain 18b travels to the post-traveling position S2 (fully closed position) where the entire imaging area 20a of the imaging element 20 is shielded as illustrated in FIG. 3(E), the exposure of the imaging area 20a of the imaging element 20 ends.

Figure 3:
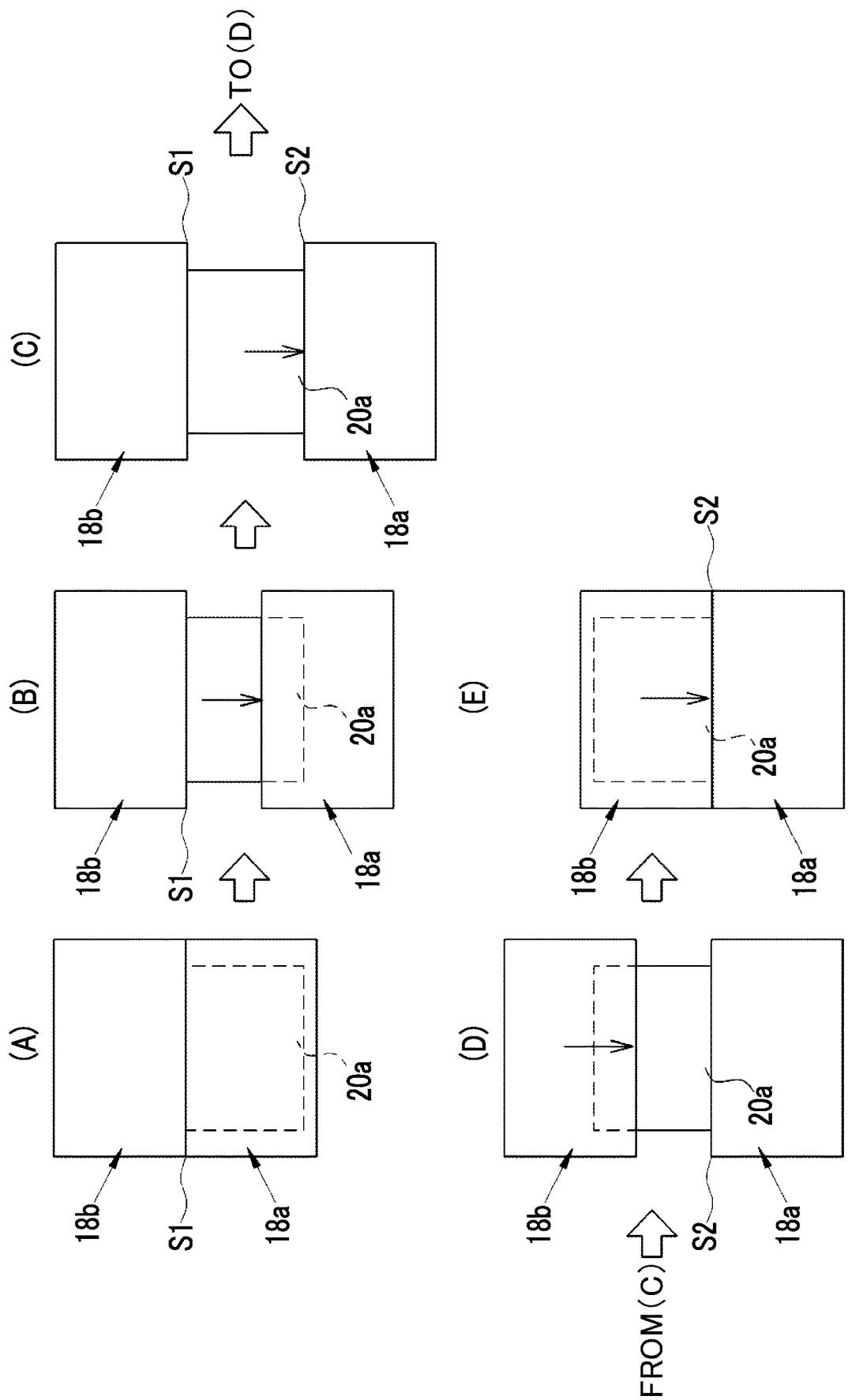
FIG. 3 is a diagram illustrating the operation of a focal-plane shutter.

In the case of the focal-plane shutter, the partial exposure region is transferred in one direction from an upper end which is one end of the imaging area 20a to a lower end which is the other end in FIG. 3. For example, while the shutter front curtain 18a is traveling as illustrated in FIG. 3(B), the partial exposure region is generated in an upper portion of the imaging area 20a. In a case in which illumination light is incident on the imaging area 20a during the traveling, only the upper portion of the imaging area 20a is exposed. Then, while the shutter rear curtain 18b travels through the fully open position illustrated in FIG. 3(C) as illustrated in FIG. 3(D), the partial exposure region is generated in a lower portion of the imaging area 20a. In a case in which illumination light is incident on the imaging area 20a during the traveling, only the lower portion of the imaging area 20a is exposed. As such, since the partial exposure region is transferred from one end to the other end of the imaging area 20a, the use of the transition period of the partial exposure region makes it possible to selectively change the exposure region of the imaging area 20a.

In this embodiment, the shutter speed is defined on the basis of the time when the shutter 18 is at the fully open position. That is, as the fully open position becomes longer, the shutter speed becomes lower. As the fully open position becomes shorter, the shutter speed becomes higher. That is, in a case in which the shutter speed is high, the driving mechanism 19 performs control such that the difference between the time when the shutter front curtain 18a starts to travel and the time when the shutter rear curtain 18*b* starts to travel is reduced. The traveling speed of the shutter front curtain 18*a* and the shutter rear curtain 18*b* is constant regardless of the shutter speed.

In this embodiment, as illustrated in FIG. 4A, an inverted image 21A is formed in the imaging area 20*a* of the imaging element 20 by the imaging optical system 16. That is, the imaging element 20 captures the inverted image 21A obtained by reversing the image of the object in the horizontal and vertical directions. Therefore, a digital signal processing unit 25 which will be described below performs a horizontal and vertical reversal process of reversing the inverted image captured by the imaging element 20 in the horizontal and vertical directions to generate a captured image 21B. In this way, the object in the captured image 21B is matched with the actual object in the horizontal and vertical directions.

In FIG. 2, the imaging element 20 includes signal processing circuits (which are not illustrated) such as a noise removal circuit, an auto gain controller, and an A/D conversion circuit. The noise removal circuit performs the noise removal process for an imaging signal. The auto gain controller amplifies the level of the imaging signal to an optimum value. The A/D conversion circuit converts the imaging signal into a digital signal and outputs the digital signal from the imaging element 20.

The imaging element 20 and the main control unit 22 are connected to a bus 23. In addition, a memory control unit 24, the digital signal processing unit 25, a media control unit 26, a rear display control unit 27, an illumination control unit 28, and a wireless interface (I/F) 29 are connected to the bus 23.

A memory 30 for temporary storage, such as a synchronous dynamic random access memory (SDRAM), is connected to the memory control unit 24. The memory control unit 24 inputs image data output from the imaging element 20 to the memory 30 so as to be stored in the memory 30. In addition, the memory control unit 24 outputs the image data stored in the memory 30 to the digital signal processing unit 25. The memory 30 stores emission control information which will be described below.

The digital signal processing unit 25 performs known image processing, such as a horizontal and vertical reversal process, matrix calculation, a demosaicing process, γ correction, brightness/color difference conversion, and a resizing process, for the image data input from the memory 30 to generate a captured image.

The media control unit 26 controls the recording and reading of an image file on and from a recording medium 31. The recording medium 31 is, for example, a memory card having a flash memory provided therein. The media control unit 26 records the image data compressed by the digital signal processing unit 25 on the recording medium 31.

The rear display control unit 27 controls the display of an image on the rear display unit 15. Specifically, the rear display control unit 27 generates a video signal based on, for example, an NTSC standard on the basis of the image data generated by the digital signal processing unit 25 and outputs the video signal to the rear display unit 15.

The illumination control unit 28 transmits emission control signals for controlling the emission times of the illuminating devices A to C. The wireless I/F 29 wirelessly transmits the emission control signals for the illuminating devices B and C transmitted from the illumination control unit 28. The illuminating device A is connected to the illumination control unit 28 and directly receives the emission control signal for the illuminating device A. The illuminating devices B and C receive the emission control signals transmitted from the illumination control unit 28 through the wireless I/F 29.

In a case in which imaging is performed using a plurality of illuminating devices in the digital camera 11, a plural illumination control mode is selected. In the plural illumination control mode, the digital camera 11 sets emission control information for the plurality of illuminating devices, controls the emission of the illuminating devices on the basis of the set emission control information, and performs a main imaging operation.

The main control unit 22 includes a pre-image acquisition unit 32, an emission time determination unit 33, and an emission control information setting unit 34. In a case in which the plural illumination control mode is selected, the pre-image acquisition unit 32 performs a pre-imaging operation which controls the imaging element 20 and the illumination control unit 28 such that the image of the object is captured in a state in which any one of the illuminating devices A to C emits light before the main imaging operation.

In a case in which the pre-image acquisition unit 32 acquires a pre-image, for example, the pre-image acquisition unit 32 directs the imaging element 20 to capture the image of the object in a state in which the illuminating devices A to C independently emit light during the shutter fully open period of the shutter 18. This configuration makes it possible to perform the pre-imaging operation in the current irradiation range of each of the illuminating devices A to C.

Figure 5:
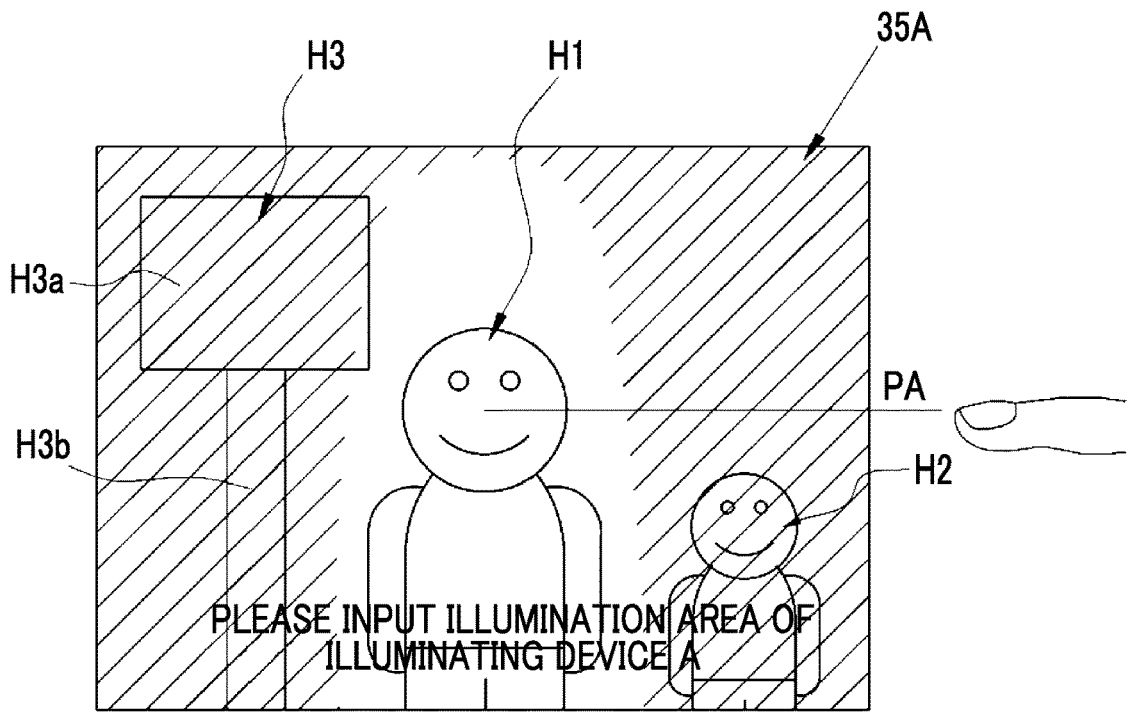
FIG. 5 is a diagram illustrating an example of an input screen in a case in which a touch operation is performed in a state in which a pre-image captured while an illuminating device A emits light is displayed.
Figure 6:
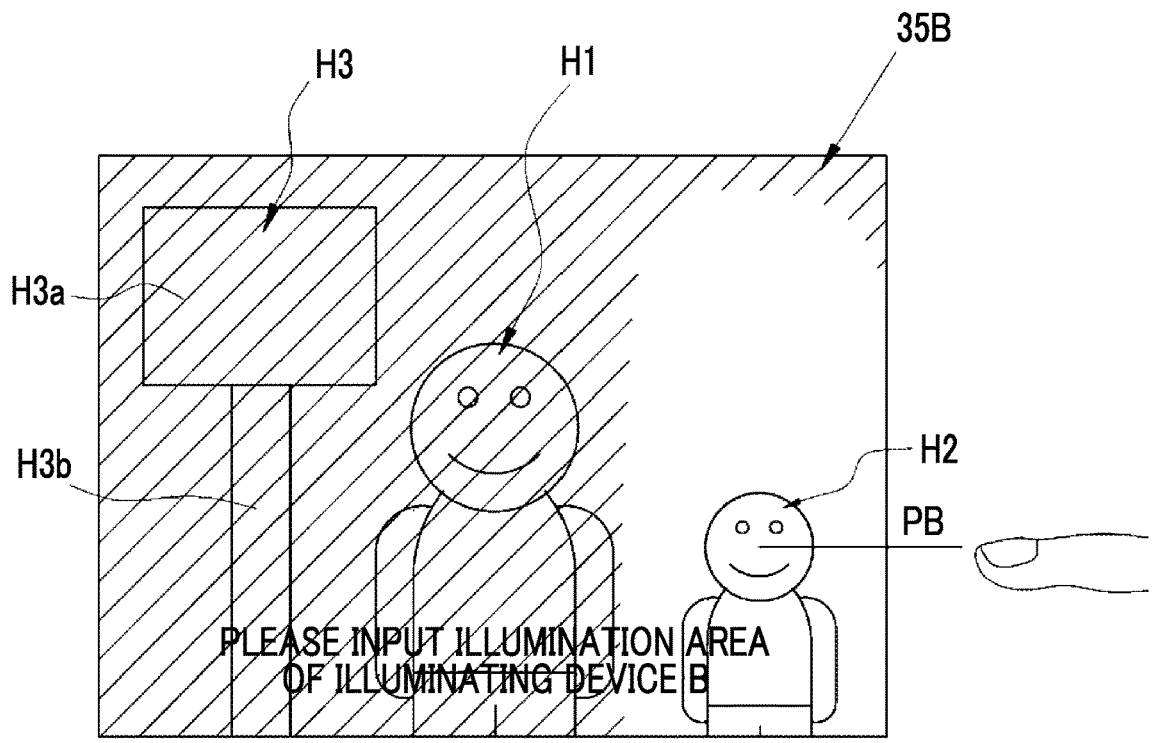
FIG. 6 is a diagram illustrating an example of an input screen in a case in which a touch operation is performed in a state in which a pre-image captured while an illuminating device B emits light is displayed.
Figure 7:
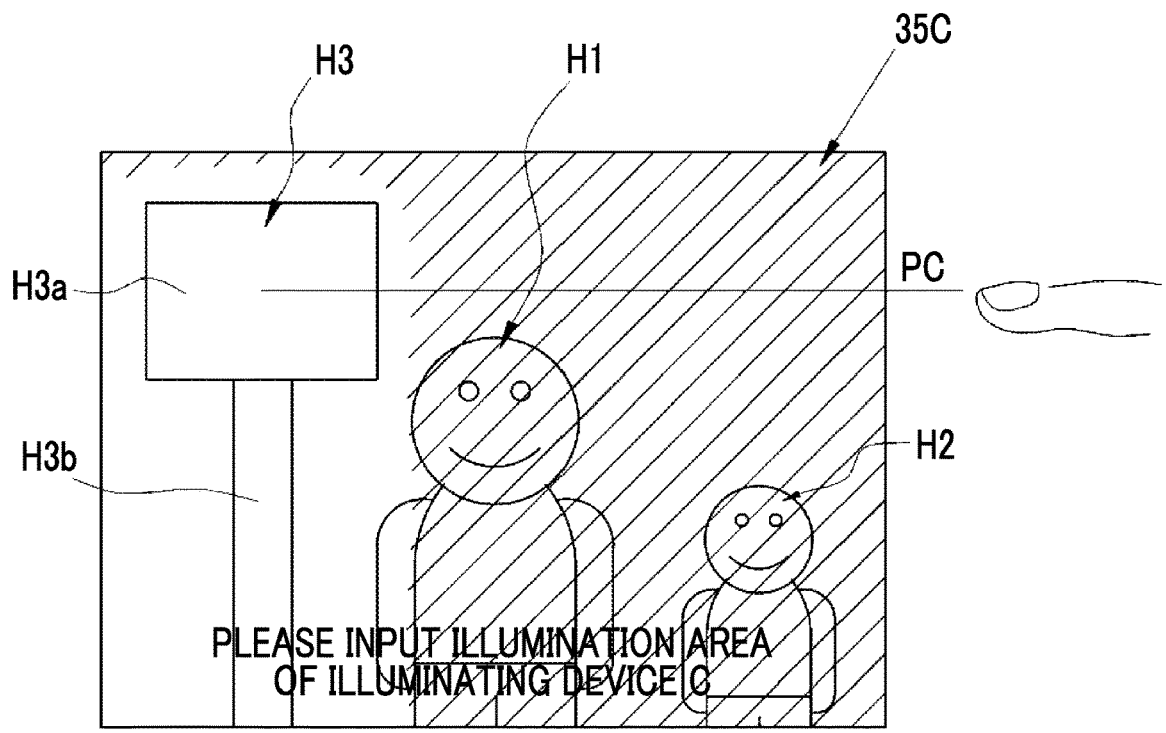
FIG. 7 is a diagram illustrating an example of an input screen in a case in which a touch operation is performed in a state in which a pre-image captured while an illuminating device C emits light is displayed.

The pre-image acquisition unit 32 controls the digital signal processing unit 25 such that image processing is performed for the image data obtained by the pre-imaging operation with each of the illuminating devices A to C to generate pre-images 35A to 35C (see FIGS. 5 to 7). Each of the acquired pre-images 35A to 35C is temporarily stored in the memory 30. The pre-images 35A to 35C function as operation images for designating the illumination position of each of the illuminating devices A to C in the imaging area 20*a*.

As illustrated in the example of FIGS. 5 to 7, the touch panel 17 functions as an operation input receiving unit that receives the input of an operation of designating any designated position of the pre-images 35A to 35C in a state in which the pre-images 35A to 35C are displayed on the rear display unit 15. For example, the pre-images 35A to 35C are selectively displayed and the reception of the input of the operation is performed for each of the pre-images 35A to 35C. In this way, it is possible to independently designate the irradiation area of each of the illuminating devices A to C.

Specifically, first, the main control unit 22 selectively displays the pre-images 35A to 35C on the rear display unit 15 and displays a message that prompts the user to input the operation of designating any designated position of the pre-images 35A to 35C as the irradiation area of the illuminating devices A to C. In a case in which an operation of touching the touch panel 17 is performed in this state, the touch panel 17 receives the input of an operation of designating any designated position.

In the pre-image 35A illustrated in FIG. 5, the entire region of the object H1, which is located at the center of the screen, in the up-down direction is the irradiation area which is irradiated with illumination light by the illuminating device A and a hatched portion which is located on the left and right sides of the object H1 is not irradiated with the illumination light. For example, in a case in which the user does not set the irradiation area of the object H1 to the entire region of the object H1 in the up-down direction, but wants to narrow the irradiation area to a face portion of the object H1, the face portion of the object H1 in the pre-image 35A is designated as a designated position PA. In this way, a peripheral area of the designated position PA is designated as the irradiation area of the illuminating device A and the irradiation area is set to be narrowed to the face portion of the object H1.

The designation operation is performed by a touch operation for the touch panel 17 in a state in which the pre-image 35A is displayed on the rear display unit 15. In addition, a message "Please, designate the irradiation area of the illuminating device A corresponding to the pre-image 35A" which prompts the user to input an operation is displayed in the pre-image 35A.

In the pre-image 35B illustrated in FIG. 6, the entire region of the object H2, which is located on the right side of the screen, in the up-down direction is an irradiation area which is irradiated with illumination light by the illuminating device B and a hatched portion which is located on the left side of the object H2 is not irradiated with the illumination light. For example, similarly to the object H1, in a case in which the user does not set the irradiation area of the object to the entire region of the object H2 in the up-down direction, but wants to narrow the irradiation area to a face portion of the object H2, the face portion of the object H2 in the pre-image 35B is designated as a designated position PB. In this way, a peripheral area of the designated position PB is designated as the irradiation area of the illuminating device B and the irradiation area is set to be narrowed to the face portion of the object H2.

In the pre-image 35C illustrated in FIG. 7, the entire region of the object H3, which is located on the left side of the screen, in the up-down direction is an irradiation area which is irradiated with illumination light by the illuminating device C. A hatched portion which is located on the right side of the object H3 is not irradiated with the illumination light. For example, in a case in which the user does not set the irradiation area of the object H3 to the entire portion including the sign H3a and the column H3b in the up-down direction, but wants to narrow the irradiation area to a portion corresponding to the sign H3a of the object H3, the sign H3a of the object H3 in the pre-image 35C is designated as a designated position PC. In this way, a peripheral area of the designated position PC is designated as the irradiation area of the illuminating device C and the irradiation area is set to be narrowed to the sign H3a of the object H3.

The operation of designating the designated positions PB and PC is performed by a touch operation for the touch panel 17 in a state in which the pre-images 35B and 35C are displayed on the rear display unit 15, similarly to the pre-image 35A.

Figure 8:
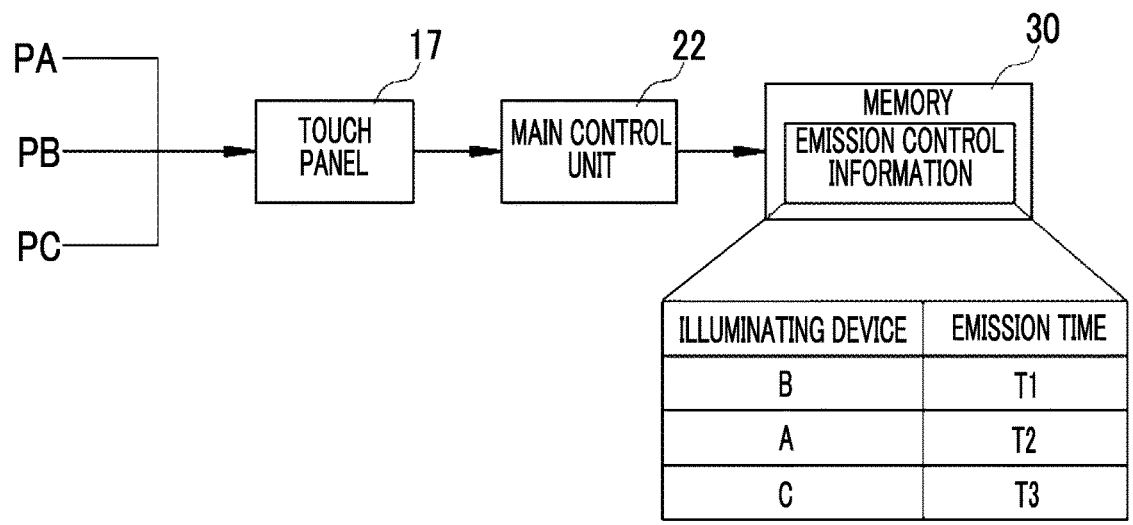
FIG. 8 is a diagram illustrating the determination of an emission time on the basis of a designated position designated by a touch operation and the setting of emission control information.

As illustrated in FIG. 8, the designated positions PA to PC designated by the above-mentioned operation are input to the emission time determination unit 33. The emission time determination unit 33 determines the emission time of the illuminating devices A to C on the basis of the designated positions PA to PC.

Figure 9:
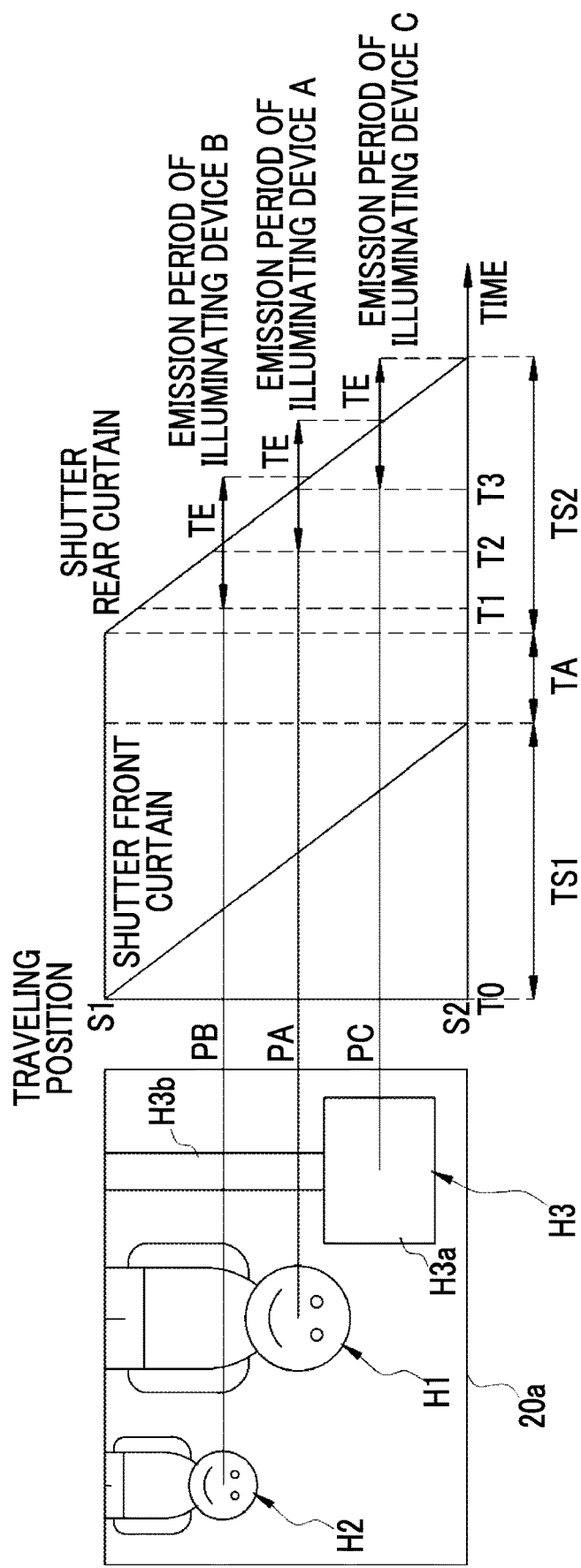
FIG. 9 is a timing chart illustrating an example of the emission times of the illuminating devices A to C.

The timing chart illustrated in FIG. 9 illustrates an example of the designation of emission times T1 to T3 on the basis of the designated positions PA to PC designated in the example illustrated in FIGS. 5 to 7. In the example illustrated in FIG. 9, the emission times T1 to T3 are determined according to the designated positions PA to PC and the traveling position of the shutter 18. The emission times T1 to T3 are the times elapsed since a travel start time T0 of the shutter front curtain 18a. In FIG. 9, the imaging area 20a is illustrated so as to be contrasted with the traveling position of the shutter 18. Since an inverted image obtained by reversing the image of the object in the horizontal and vertical directions is formed in the imaging area 20a, the designated positions PA to PC in the imaging area 20a are also reversed in the horizontal and vertical directions in FIG. 9. As described above, the first traveling period TS1 for which the shutter front curtain 18a travels and the second traveling period TS2 for which the shutter rear curtain 18b travels are the transition period for which the partial exposure region that is exposed in the imaging area 20a is transferred over time. A shutter fully open period TA is interposed between the first traveling period TS1 and the second traveling period TS2. However, the partial exposure region is transferred from one end to the other end of the imaging area 20a as a whole.

The emission time determination unit 33 determines the emission times T1 to T3 to be different times within the second traveling period TS2 of the shutter rear curtain 18b. In this embodiment, the emission times T1 to T3 are determined such that the illuminating devices A to C emit light at the time when a peripheral region including the designated positions PA to PC is the partial exposure region.

Specifically, the emission time determination unit 33 determines the emission times T1 to T3 to be different times within the second traveling period TS2 for which the shutter rear curtain 18b travels after the shutter fully open period TA. The second traveling period TS2 is the transition period for which the partial exposure region is transferred. Therefore, in a case in which the emission times T1 to T3 are determined to be different times within the second traveling period TS2, it is possible to change the irradiation areas of the illuminating devices A to C in the imaging area 20a. In addition, in this embodiment, the emission periods TE of the illuminating devices A to C are substantially equal to each other.

In the example illustrated in FIG. 9, among the designated positions PB, PA, and PC, the designated position PB is located at the highest position in the imaging area 20a, followed by the designated position PA and the designated position PC. Then, for the second traveling period TS2, the traveling position of the shutter rear curtain 18b varies over time depending on the direction. In a case in which the time when the shutter rear curtain 18b that drops from the upper side shields a body portion of the object H2 except the face portion in the imaging area 20a is the emission time T1 of the illuminating device B, only the face portion of the object H2 is the irradiation area since the body portion is shielded.

In a case in which the shutter rear curtain 18b further travels, the partial exposure region is further transferred toward the lower side of the imaging area 20a. In a case in which the time when the shutter rear curtain 18b shields a body portion of the object H1 except the face portion in the imaging area 20a is the emission time T2 of the illuminating device A, only the face portion of the object H1 is the irradiation area.

Similarly, in a case in which the shutter rear curtain 18b further travels, the partial exposure region is transferred toward the imaging area 20a. In a case in which the time when the shutter rear curtain 18b shields the column H3b of the object H3 except the sign H3a is the emission time T3 of the illuminating device C, only the sign H3a of the object H3 is the irradiation area.

In order to perform the above-mentioned partial exposure, the emission times T1 to T3 are determined according to the designated positions PB, PA, and PC.

The emission control information setting unit 34 stores the emission time determined by the emission time determination unit 33 and the unique information of the corresponding illuminating devices A to C as the emission control information in the memory 30. The pre-images 35A to 35C in which the designated positions PA to PC are designated are captured in a state in which the illuminating devices A to C emit light, respectively. Therefore, in the example illustrated in FIG. 9, the emission time T1 and the unique information of the illuminating device B are stored as the emission control information in the memory 30 so as to be associated with each other, the emission time T2 and the unique information of the illuminating device A are stored as the emission control information in the memory 30 so as to be associated with each other, and the emission time T3 and the unique information of the illuminating device C are stored as the emission control information in the memory 30 so as to be associated with each other.

In a case in which the emission control information has been stored in the memory 30 before it is stored by the emission control information setting unit 34, the emission control information is updated to the latest emission control information. The unique information of the illuminating device A is stored in the memory 30, for example, in the stage in which the digital camera 11 is manufactured. For the unique information of the illuminating devices B and C, for example, communication between the illuminating devices B and C and the main control unit 22 is performed through the wireless I/F 29 to acquire the unique information stored in the memories of the illuminating devices B and C.

In a case in which the main imaging operation is performed in the plural illumination control mode, the main control unit 22 reads the emission control information from the memory 30 and controls the illumination control unit 28 such that the emission control signals are transmitted on the basis of the emission times T1 to T3 read from the memory 30 and the unique information of the corresponding illuminating devices A to C.

Figure 12:
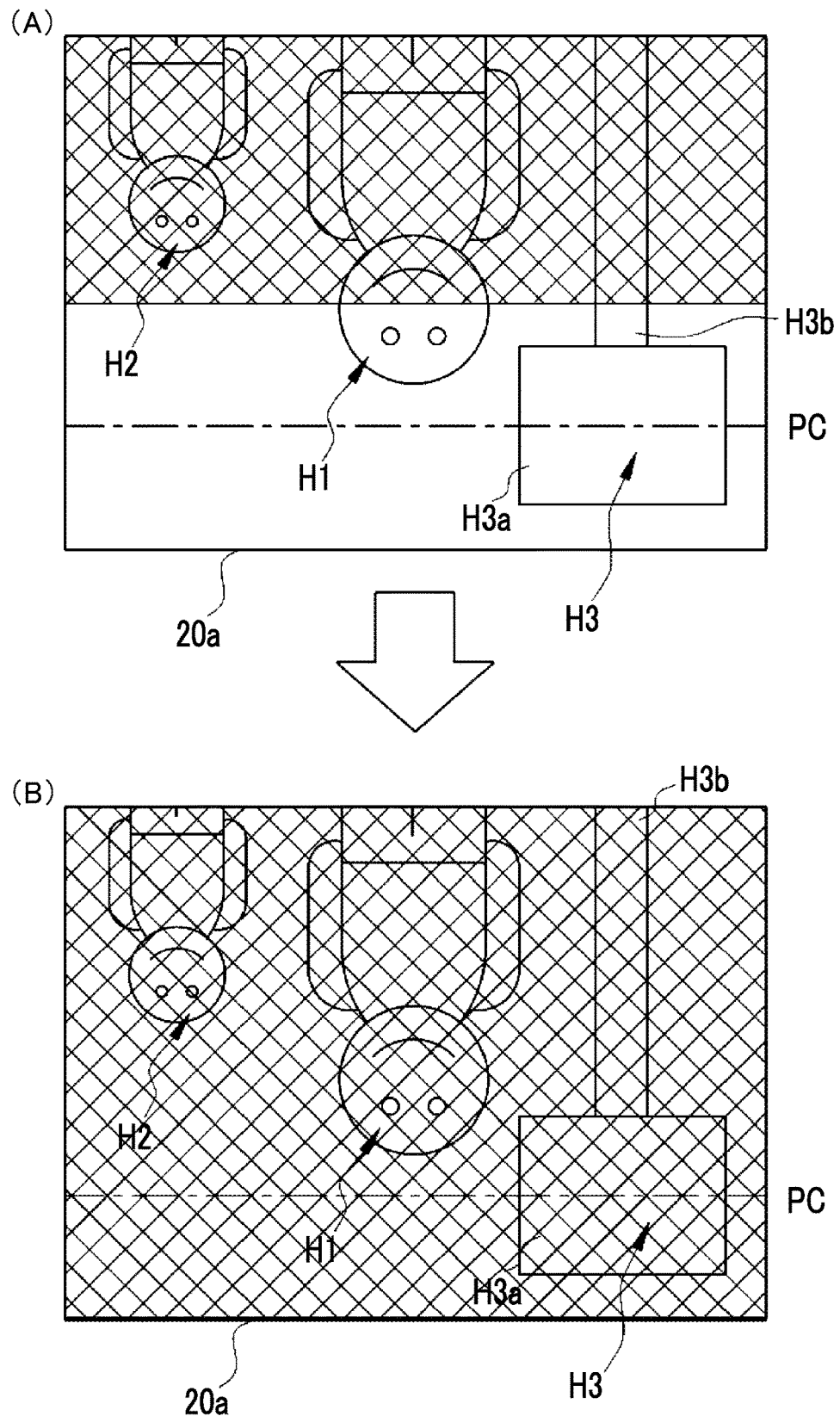
FIG. 12 is a diagram illustrating an example of a partial exposure region when an emission period of the illuminating device C starts and ends in the first embodiment.

An aspect of the transition of the partial exposure region in a case in which the driving control of the shutter 18 and the emission control of the illuminating devices A to C are performed on the basis of the timing chart illustrated in FIG. 9 will be described in detail with reference to FIGS. 10 to 12.

As illustrated in FIG. 10(A), at the emission time T2 when the illuminating device A starts to emit light, the shutter rear curtain 18b is at a position that is higher than the designated position PA and a region from the vicinity of the head to a lower portion (an upper portion in the imaging area 20a) of the object H1 illuminated by the illuminating device A is within the shielding range (hatched portion) of the shutter rear curtain 18b. As illustrated in FIG. 10(B), at the time (T2+TE) when the illuminating device A ends the emission of light, the shutter rear curtain 18b is at a position that is lower than the designated position PA and the entire object H1 is within the shielding range of the shutter rear curtain 18b. That is, for the emission period of the illuminating device A, a region from the vicinity of the head to an upper portion (a lower portion in the imaging area 20a) of the object H1 is within the partial exposure region and the image of the region is formed in the imaging area 20a.

As illustrated in FIG. 11(A), at the emission time T1 when the illuminating device B starts to emit light, the shutter rear curtain 18b is at a position that is higher than the designated position PB and a region from the middle of the body to a lower portion (an upper portion in the imaging area 20a) of the object H2 irradiated with illumination light by the illuminating device B is within the shielding range of the shutter rear curtain 18b. As illustrated in FIG. 11(B), at the time (T1+TE) when the illuminating device B ends the emission of light, the shutter rear curtain 18b is at a position that is lower than the designated position PB and the entire object H2 is within the shielding range of the shutter rear curtain 18b. That is, for the emission period of the illuminating device B, a region from the middle of the body to an upper portion (a lower portion in the imaging area 20a) of the object H2 is within the partial exposure region and the image of the region is formed in the imaging area 20a.

As illustrated in FIG. 12(A), at the emission time T3 when the illuminating device C starts to emit light, the shutter rear curtain 18b is at a position that is higher than the designated position PC and a region from the vicinity of a lower end of the sign H3a to a lower portion (an upper portion in the imaging area 20a) of the object H3 irradiated with illumination light by the illuminating device C is within the shielding range of the shutter rear curtain 18b. As illustrated in FIG. 12(B), at the time (T3+TE) when the illuminating device C ends the emission of light, the shutter rear curtain 18b is at a position that is lower than the designated position PC and the entire object H3 is within the shielding range of the shutter rear curtain 18b. That is, for the emission period of the illuminating device C, a region from the vicinity of the lower end of the sign H3a to an upper portion (a lower portion in the imaging area 20a) of the object H3 is within the partial exposure region and the image of the region is formed in the imaging area 20a.

Figure 13:
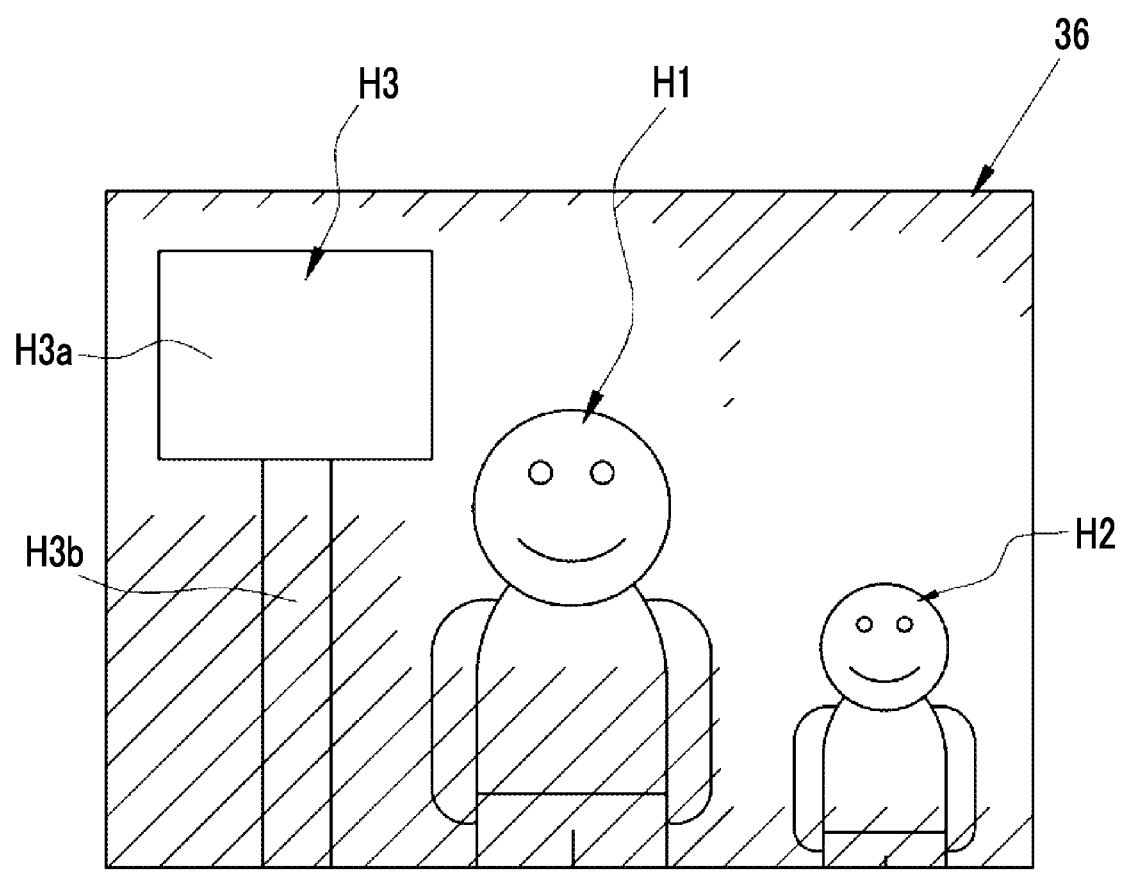
FIG. 13 is an image diagram illustrating an image captured by the imaging apparatus according to the first embodiment.

In a case in which the main imaging operation is performed under the driving control of the shutter 18 and the emission control of the illuminating devices A to C based on the timing chart illustrated in FIG. 9 and image processing including a horizontal and vertical reversal process is performed, a captured image 36 illustrated in FIG. 13 is generated. In the captured image 36, the images of the objects H1 to H3 in the partial exposure regions illustrated in FIGS. 10 to 12 are formed in the imaging area 20a for the emission periods of the illuminating devices A to C. Therefore, the irradiation area (hatched portion) is narrowed. That is, the region from the vicinity of the lower end of the head to the upper portion of the object HE the region from the middle of the body to the upper portion of the object H2, and the region from the vicinity of the lower end of the sign H3a to the upper portion of the object H3 are illuminated.

Figure 14:
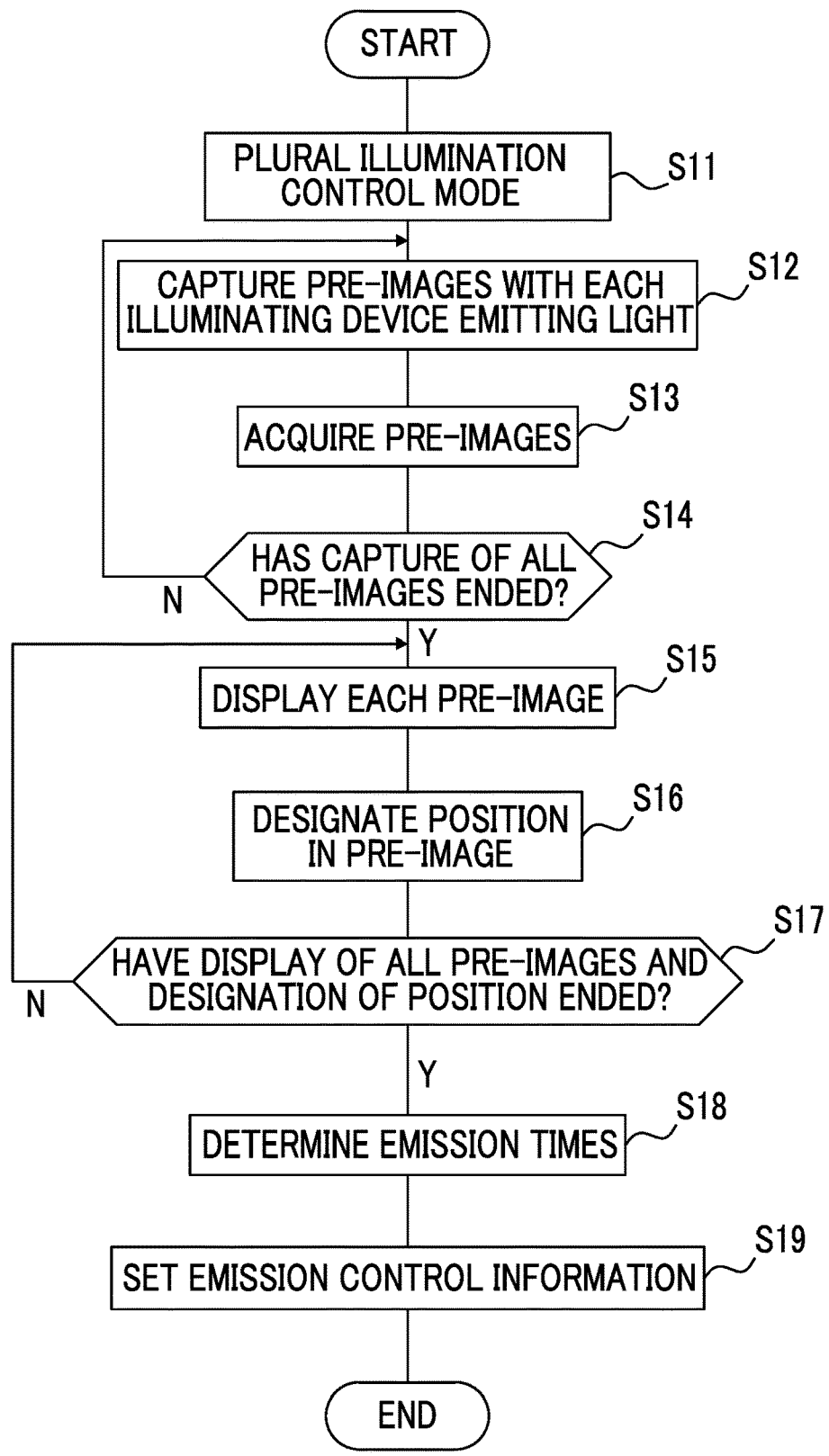
FIG. 14 is a flowchart illustrating a process procedure in a case in which a pre-image is acquired and the emission time is determined.

A process procedure in a case in which pre-images are acquired in the plural illumination control mode, the emission time is determined, and emission control information is set will be described with reference to the flowchart illustrated in FIG. 14. In a case in which the mode switching button 12B is operated to select the plural illumination control mode (S11), the pre-image acquisition unit 32 controls the imaging element 20 and the illumination control unit 28 such that the pre-imaging operation of capturing the image of the object in a state in which any one of the illuminating devices A to C emits light is performed (S12).

The digital signal processing unit 25 performs image processing for image data obtained by the pre-imaging operation for each of the illuminating devices A to C to generate the pre-images 35A to 35C. Each of the acquired pre-images 35A to 35C is temporarily stored in the memory 30 (S13). Then, the pre-imaging operation is repeated until the pre-images 35A to 35C for all of the illuminating devices A to C are acquired (N in S14).

In a case in which the pre-imaging operation ends (Y in S14), the main control unit 22 controls the rear display control unit 27 such that the pre-images 35A to 35C are sequentially displayed on the rear display unit 15 and a message that prompts the user to input the operation of designating the designated positions in the pre-images 35A to 35C as the illumination positions of the illuminating devices A to C is displayed (S15).

Then, the pre-images 35A to 35C and the message prompting the user to input the operation are sequentially displayed until all of the pre-images 35A to 35C are displayed and the designated positions are designated (S16) (N in S17).

In a case in which the display of the pre-images 35A to 35C and the designation of the positions end (Y in S17), the emission time determination unit 33 determines the emission times T1 to T3 on the basis of the designated positions PA, PB, and PC designated by a touch operation (S18). In addition, the emission control information setting unit 34 stores the emission control information including the determined emission times and the unique information of the corresponding illuminating devices A to C in the memory 30 and ends the setting process (S19).

Figure 15:
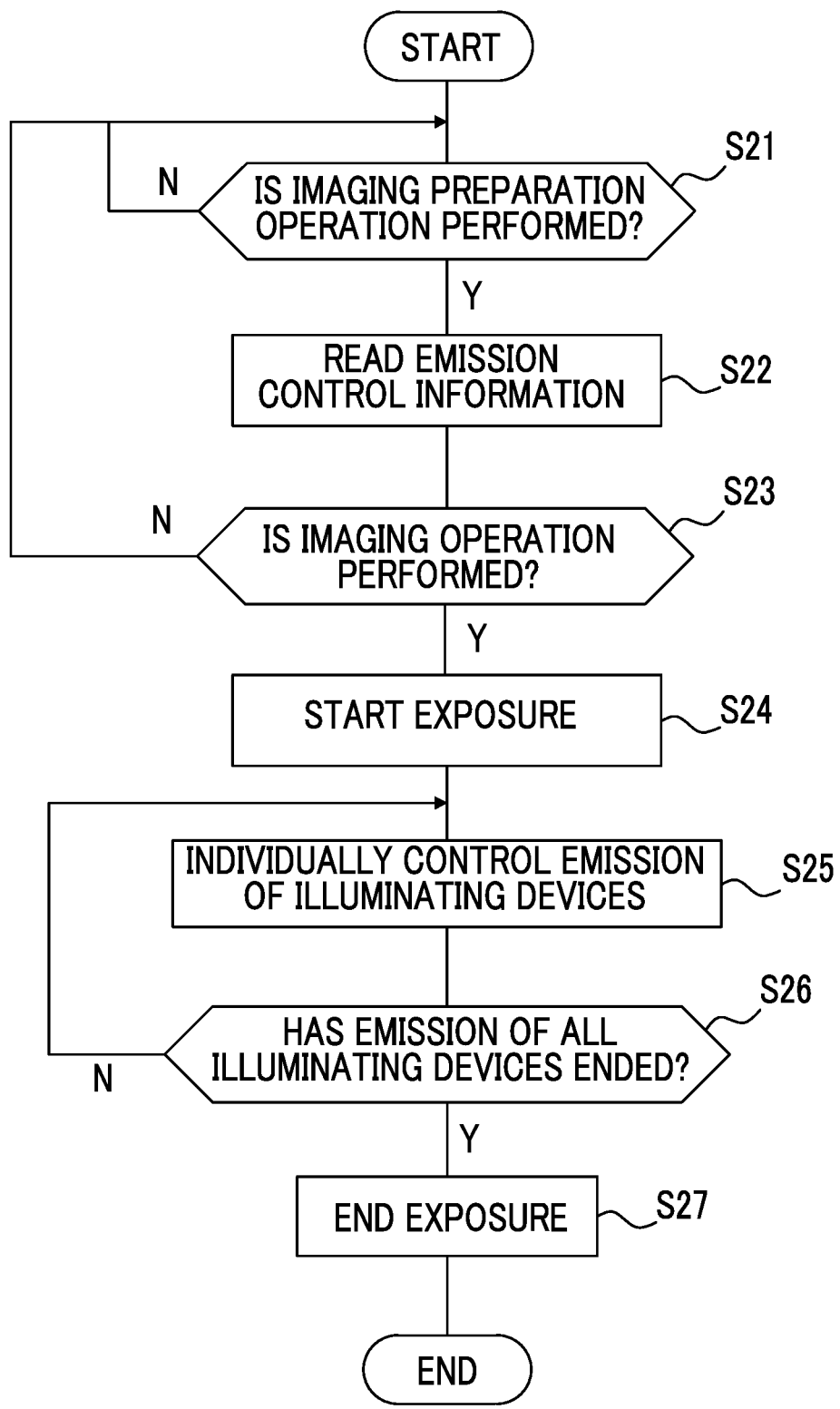
FIG. 15 is a flowchart illustrating the procedure of a process of controlling the emission of the illuminating devices A to C in a main imaging operation.

A process procedure in a case in which the digital camera 11 performs the main imaging operation after the emission control information is set will be described with reference to the flowchart illustrated in FIG. 15. In a case in which an imaging preparation operation, such as an operation of pressing the shutter button 12C halfway, is performed in the plural illumination control mode (Y in S21), the emission control information is read from the memory 30 along with the imaging preparation operation such as an auto focus operation (S22). In a case in which the imaging preparation operation is not performed (N in S21), the emission control information is not read from the memory 30.

Then, in a case in which, for example, an imaging operation of fully pressing the shutter button 12C is performed (Y in S23), the shutter front curtain 18a starts to travel and the imaging element 20 starts to be exposed (S24). That is, the transition period for which the partial exposure region is transferred over time by the shutter 18 is generated. The main control unit 22 controls the illumination control unit 28 on the basis of the emission control information such that the emission control signals are transmitted to independently control the emission of the illuminating devices A to C (S25). The illuminating devices A to C emit light at different emission times on the basis of the emission control information for the transition period for which the partial exposure region of the shutter 18 is transferred over time. The illumination control of the illumination control unit is performed until all of the illuminating devices A to C emit light (N in S26). Then, in a case in which the shutter rear curtain 18b travels to the fully closed position and the exposure of the imaging element 20 ends (S27), the capture of the image of the object by the imaging element 20 ends. In a case in which the imaging operation is not performed (N in S23), the process returns to Step S21.

As described above, for the transition period for which the partial exposure region of the shutter 18 is transferred over time, the illuminating devices A to C emit light at different emission times to perform imaging. Therefore, it is possible to obtain a captured image in which the irradiation area in which the objects H1 to H3 are irradiated with illumination light is narrowed. As a result, the irradiation area can be adjusted to some extent only by the operation of the digital camera 11, without adjusting, for example, the arrangement of the illuminating devices A to C, an irradiation angle, and the distance to the object, and it is possible to reduce the time and effort required for adjustment.

Before the main imaging operation, the pre-imaging operation is performed in a state in which one of the illuminating devices A to C emits light to acquire pre-images and the emission times T1 to T3 are determined on the basis of the designated positions designated in the pre-images. Therefore, it is easy to adjust the irradiation area to the position intended by the photographer.

Second Embodiment

In the first embodiment, the example in which the shutter front curtain 18a and the shutter rear curtain 18b are driven at a constant speed all the time regardless of the shutter speed has been described. However, the invention is not limited thereto. In the following second embodiment, a curtain speed adjustment mechanism is provided which automatically adjusts the traveling speed of the shutter front curtain 18a and the shutter rear curtain 18b, that is, a curtain speed. Therefore, the shutter 18 has a function of changing the transition period for which the partial exposure region is transferred in the imaging area 20a. In this case, the curtain speed adjustment mechanism may be provided in the shutter driving mechanism 19 that drives the shutter 18. For example, the curtain speed adjustment mechanism has the same configuration as that disclosed in JP2001-235779A. The configuration of the second embodiment is the same as the configuration of the first embodiment except that the curtain speed adjustment mechanism is provided.

In this embodiment, for example, in a case in which the shutter speed is manually input, the shutter driving mechanism 19 is controlled to change the traveling speed of the shutter front curtain 18a and the shutter rear curtain 18b according to the input shutter speed.

Figure 16:
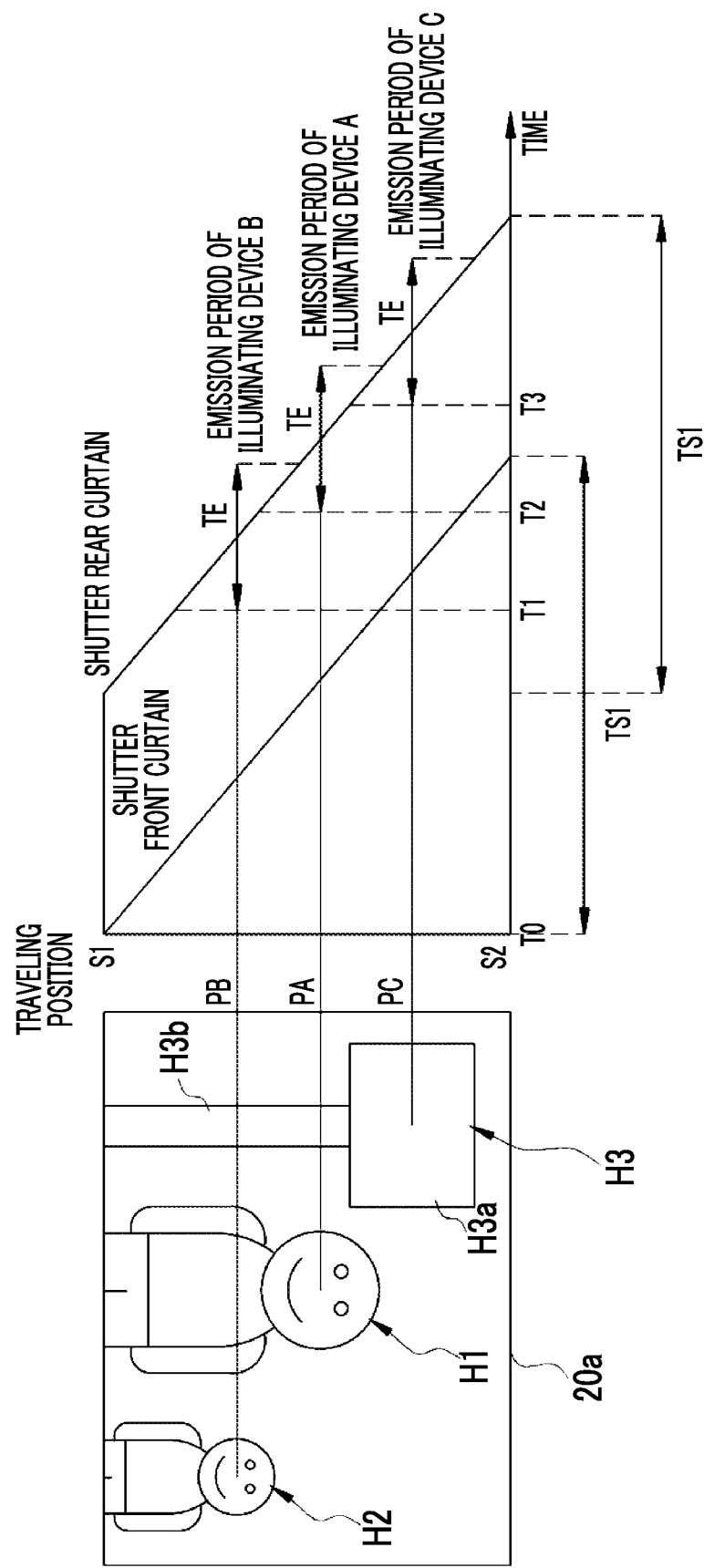
FIG. 16 is a timing chart illustrating the emission times of the illuminating devices A to C in a case in which a shutter speed is changed in a second embodiment.

FIG. 16 is a timing chart in a case in which the shutter front curtain 18a and the shutter rear curtain 18b are driven at a speed lower than the traveling speed described in the first embodiment. In the example illustrated in FIG. 16, both a first traveling period TS1 of the shutter front curtain 18a and a second traveling period TS2 of the shutter rear curtain 18b are longer than those illustrated in FIG. 9 in the first embodiment. That is, the transition period for which the partial exposure region is transferred over time in the imaging area 20a is longer than that illustrated in FIG. 9. The partial exposure region is transferred from one end to the other end of the imaging area 20a. In the example illustrated in FIG. 16, the same pre-images 35A to 35C as those in the first embodiment are acquired and the same designated positions PA to PC are designated.

The emission time determination unit 33 determines the emission times T1 to T3 to be different times within the second traveling period TS2, similarly to the first embodiment. In addition, the emission times T1 to T3 are determined such that each of the illuminating devices A to C emits light at the time when a peripheral region including the designated positions PA to PC is the partial exposure region.

Specifically, in the example illustrated in FIG. 16, there is no shutter fully open period TA and the illumination control unit 28 controls the emission times T1 to T3 to be different times within the second traveling period TS2 for which the shutter rear curtain 18b travels. The second traveling period TS2 is the transition period for which the partial exposure region is transferred. Therefore, in a case in which the emission times T1 to T3 are different from each other within the second traveling period TS2, it is possible to change the irradiation areas of the illuminating devices A to C in the imaging area 20a. Similarly to the first embodiment, the illuminating devices A to C have the same emission period TE.

An aspect of the transition of the partial exposure region in a case in which the driving control of the shutter 18 and the emission control of the illuminating devices A to C are performed on the basis of the timing chart illustrated in FIG. 16 will be described in detail with reference to FIGS. 17 to 19. In the example illustrated in FIGS. 17 to 19, the illuminating devices A to C have the same emission period TE and the transition range of the partial exposure region is less than that in the example illustrated in FIGS. 10 to 12 in the first embodiment by a value corresponding to a reduction in the traveling speed of the shutter front curtain 18a and the shutter rear curtain 18b.

As illustrated in FIG. 17(A), at the emission time T2 when the illuminating device A starts to emit light, the shutter rear curtain 18b is at a position that is higher than the designated position PA and a region from the lower end of the head to a lower portion (an upper portion in the imaging area 20a) of the object H1 irradiated with illumination light by the illuminating device A is within the shielding range (hatched portion) of the shutter rear curtain 18b. As illustrated in FIG. 17(B), at the time (T2+TE) when the illuminating device A ends the emission of light, the shutter rear curtain 18b is at a position that is lower than the designated position PA and the entire object H1 is within the shielding range of the shutter rear curtain 18b. That is, for the emission period of the illuminating device A, a region from the lower end of the head to an upper portion (a lower portion in the imaging area 20a) of the object H1 is within the partial exposure region and the image of the region is formed in the imaging area 20a.

As illustrated in FIG. 18(A), at the emission time T1 when the illuminating device B starts to emit light, the shutter rear curtain 18b is at a position that is higher than the designated position PB and a region from the vicinity of the head to a lower portion (an upper portion in the imaging area 20a) of the object H2 irradiated with illumination light by the illuminating device B is within the shielding range of the shutter rear curtain 18b. As illustrated in FIG. 18(B), at the time (T1+TE) when the illuminating device B ends the emission of light, the shutter rear curtain 18b is at a position that is lower than the designated position PB and the entire object H2 is within the shielding range of the shutter rear curtain 18b. That is, for the emission period of the illuminating device B, a region from the vicinity of the head to an upper portion (a lower portion in the imaging area 20a) of the object H2 is within the partial exposure region and the image of the region is formed in the imaging area 20a.

As illustrated in FIG. 19(A), at the emission time T3 when the illuminating device C starts to emit light, the shutter rear curtain 18b is at a position that is higher than the designated position PC and a region from a lower end of the sign H3a to a lower portion (an upper portion in the imaging area 20a) of the object H3 irradiated with illumination light by the illuminating device C is within the shielding range of the shutter rear curtain 18b. As illustrated in FIG. 19(B), at the time (T3+TE) when the illuminating device C ends the emission of light, the shutter rear curtain 18b is at a position that is lower than the designated position PC and the entire object H3 is within the shielding range of the shutter rear curtain 18b. That is, for the emission period of the illuminating device C, a region from the lower end of the sign H3a to an upper portion (a lower portion in the imaging area 20a) of the object H3 is within the partial exposure region and the image of the region is formed in the imaging area 20a.

Figure 20:
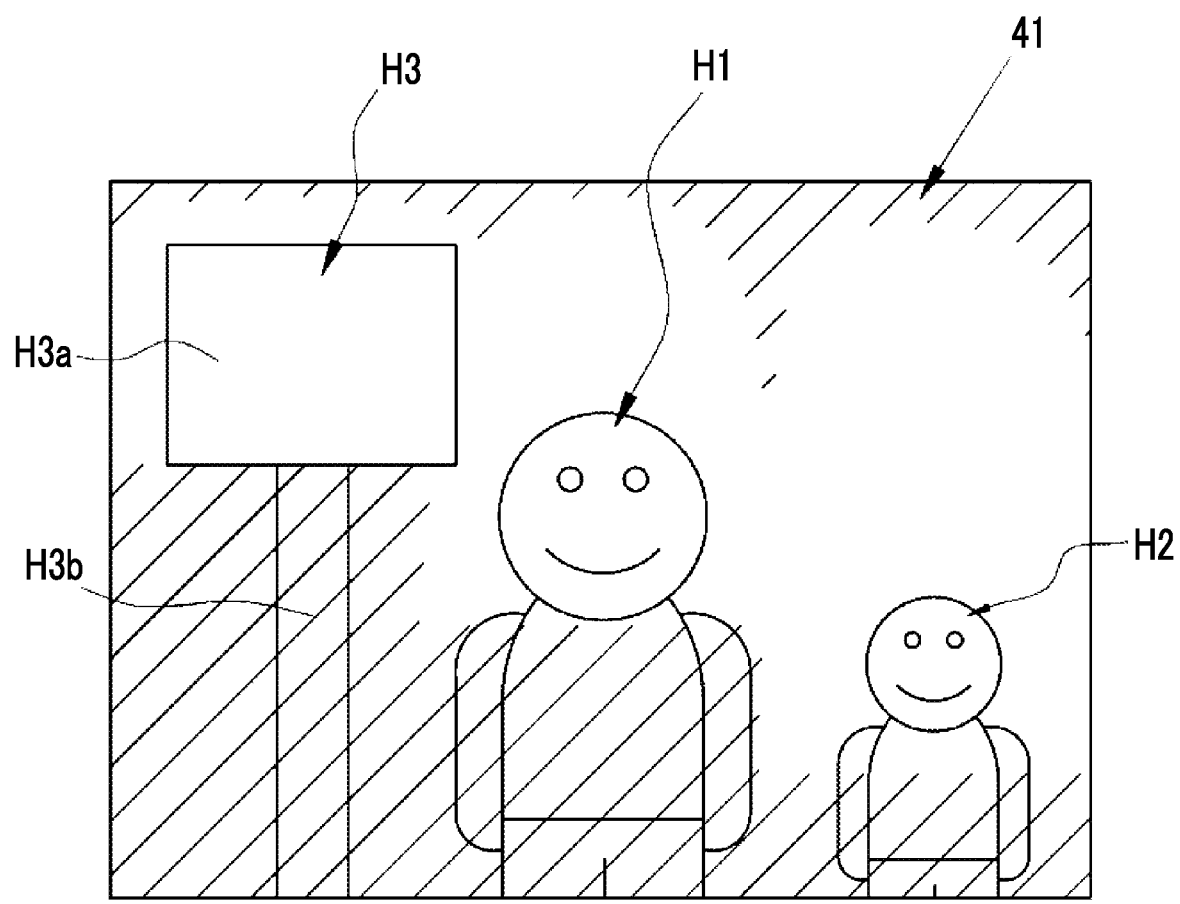
FIG. 20 is an image diagram illustrating an image captured by an imaging apparatus according to the second embodiment.

In a case in which the main imaging operation is performed under the driving control of the shutter 18 and the emission control of the illuminating devices A to C based on the timing chart illustrated in FIG. 16 and image processing including a horizontal and vertical reversal process is performed, a captured image 41 illustrated in FIG. 20 is generated. In the captured image 41, the images of the objects H1 to H3 are formed in the partial exposure regions illustrated in FIGS. 17 to 19 in the imaging area 20a for the emission periods of the illuminating devices A to C. Therefore, the irradiation area (hatched portion) is narrower than that in the captured image 36 of the first embodiment. That is, the region from the lower end of the head to the upper portion of the object H1, the region from the vicinity of the head to the upper portion of the object H2, and the region from the lower end of the sign H3a to the upper portion of the object H3 are illuminated.

As described above, the curtain speed of the shutter 18 is reduced to change the transition period for which the partial exposure region that is partially exposed in the imaging area 20a is transferred over time, which makes it possible to further narrow the irradiation area. Therefore, it is possible to further reduce the time and effort required to adjust the illuminating devices A to C.

In the first and second embodiments, the emission times T1 to T3 are controlled to be different times within the second traveling period TS2. However, the invention is not limited thereto. The illumination control unit 28 may control the emission times T1 to T3 to be different times within the first traveling period TS1 or the second traveling period TS2. For example, the illumination control unit 28 may control the emission times T1 to T3 to be different times within the first traveling period TS1. Alternatively, the illumination control unit 28 may determine the emission time T1 within the first traveling period TS1, determine the emission time T2 within the second traveling period TS2, and perform control such that the illuminating devices A to C emit light at the determined times.

Figure 21:
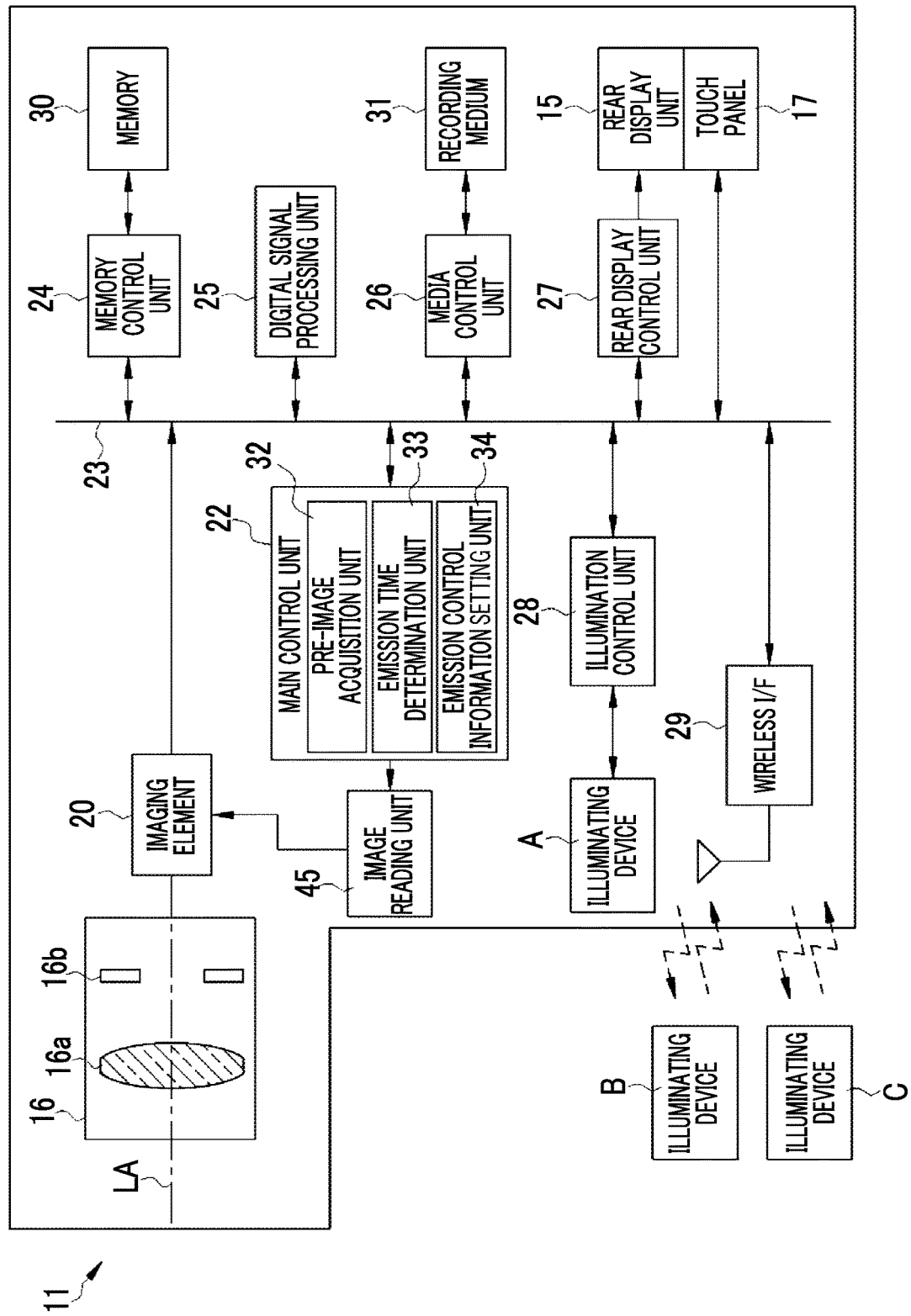
FIG. 21 is a block diagram illustrating the configuration of a modification example including a rolling-shutter-type image reading unit.

In the first and second embodiments, the focal-plane shutter that is provided separately from the imaging element 20 is given as an example of the shutter that generates the transition period for which the partial exposure region that is partially exposed in the imaging area 20a is transferred from one end to the other end of the imaging area 20a over time. However, the invention is not limited thereto. In a modification example illustrated in FIGS. 21 and 22, in a case in which the imaging element 20 is a complementary metal oxide semiconductor (CMOS) image sensor, an image reading unit 45 that controls the imaging element 20 such that an image signal is read by a rolling shutter method is provided as the shutter. In FIG. 21, the shutter 18 which is a focal-plane shutter is not provided and the image reading unit 45 is provided. The same components as those in the first embodiment are denoted by the same reference numerals and the description thereof will not be repeated. The difference from the first embodiment will be mainly described.

In this modification example, the main control unit 22 controls the image reading unit 45 such that the imaging element 20 is driven. The rolling-shutter-type image reading unit 45 sequentially performs charge accumulation and reading for each line and for each pixel of each line in the imaging area 20a.

As illustrated in FIG. 22, the image reading unit 45 sequentially performs charge accumulation and reading for the imaging element 20 from a top line LS to a bottom line LE of the imaging area 20a and from a leftmost pixel to a rightmost pixel in each line. In the timing chart illustrated in FIG. 22, a rectangle that is illustrated so as to correspond to the position of each line of the imaging area 20a indicates a period required to read each line. The charge accumulation and reading start at the time based on a command from the main control unit 22 that controls the image reading unit 45.

After the exposure of the imaging area 20a starts, that is, after the charge accumulation and reading start to be performed for the top line LS of the imaging area 20a, the charge accumulation and reading sequentially start to be performed for each line. A reading start period TR1 until the charge accumulation and reading start to be performed for the fully open position, that is, the bottom line LE is the transition period for which the partial exposure region that is partially exposed is transferred over time in the imaging area 20a.

In a case in which the shutter fully open period TA is present, after the reading start period TR1, the charge accumulation and reading are performed for all lines of the imaging area 20a on the basis of a predetermined shutter speed. After the shutter fully open period, the charge accumulation and reading sequentially performed from the top line LS of the imaging area 20a end. In addition, in a case in which the shutter fully open period TA is absent, the charge accumulation and reading for the top line LS end before the charge accumulation and reading are performed for the bottom line LE of the imaging area 20a.

After the charge accumulation and reading for the top line LS of the imaging area 20a end, the charge accumulation and reading sequentially performed for each line end. A reading end period TR2 until the charge accumulation and reading for the fully closed position, that is, the bottom line LE end is the transition period for which the partial exposure region that is partially exposed in the imaging area 20a is transferred downward over time. In the example illustrated in FIG. 22, the shutter fully open period TA is interposed between the reading start period TR1 and the reading end period TR2. However, the partial exposure region is transferred from one end to the other end of the imaging area 20a as a whole.

Similarly to each of the above-described embodiments, the emission time determination unit 33 determines the emission times T1 to T3 of the illuminating devices A to C to be different times within the reading end period TR2 which is the transition period for which the partial exposure region is transferred over time. The illumination control unit 28 performs control such that the illuminating devices A to C emit light at the emission times determined by the emission time determination unit 33 and the main imaging operation is performed. Therefore, it is possible to obtain the same effect as that in the first embodiment. The invention is not limited thereto. The illumination control unit 28 may control the emission times T1 to T3 to be different times within the reading start period TR1 or the reading end period TR2. For example, the illumination control unit 28 may control the emission times T1 to T3 to be different times within the reading start period TR1. Alternatively, the illumination control unit 28 may determine the emission time T1 within the reading start period TR1, determine the emission time T2 within the reading end period TR2, and perform control such that the illuminating devices A to C emit light at the determined times.

The configuration of the modification example including the image reading unit 45 may be applied to the second embodiment. In this modification example, in a case in which a function of changing the transition period for which the partial exposure region is transferred in the imaging area 20a is provided, it is not necessary to mechanically change the curtain speed of the shutter as in the focal-plane shutter and the time when charge accumulation and reading are performed for each line may be changed.

The configurations of the shutters 18 according to the first and second embodiments may be combined with the configuration of the rolling-shutter-type image reading unit 45 according to the modification example. For example, a period from the start of the exposure of the top line LS to the fully open position may be the reading start period TR1 for which the image reading unit 45 performs charge accumulation and reading for each line and a period from the end of the exposure of the top line LS to the fully closed position may be the second traveling period TS2 for which the shutter rear curtain 18b travels downward.

In each of the above-described embodiments, the digital camera that controls three illuminating devices A to C has been described as an example. However, the invention may be applied to a digital camera that controls at least two illuminating devices. In addition, it is preferable that at least two illuminating devices combined with the digital camera include, for example, at least one of a built-in strobe device that is provided in an imaging apparatus body, an external strobe device that is attached to the imaging apparatus body, or an independent illuminating device that is independent of the imaging apparatus. In addition, the illuminating device is not limited to the strobe device and may be other illuminating devices. The number of illuminating devices and the type of illuminating device appropriately change depending on, for example, the number, size, and arrangement of objects.

In each of the above-described embodiments, the lens-integrated digital camera in which the camera body and the lens barrel are integrally provided has been described as an example. However, the invention may be applied to other imaging apparatuses including an interchangeable lens digital camera in which a camera body and a lens barrel are separately provided and are detachable.

EXPLANATION OF REFERENCES

10: imaging system
11: digital camera
12: camera body
12A: power button
12B: mode switching button
12C: shutter button
13: stand
14: lens barrel
15: rear display unit (image display unit)
16: imaging optical system
16a: lens
16b: stop
17: touch panel
18: shutter
18a: shutter front curtain
18b: shutter rear curtain
19: shutter driving mechanism
20: imaging element
20a: imaging area
21A: inverted image
21B: captured image
22: main control unit
23: bus
24: memory control unit
25: digital signal processing unit
26: media control unit
27: rear display control unit
28: illumination control unit
29: wireless I/F
30: memory
31: recording medium
32: pre-image acquisition unit 33: emission time determination unit
34: emission control information setting unit
35A, 35B, 35C: pre-image
36, 41: captured image
45: image reading unit
A, B, C: illuminating device
H1, H2, H3: object
H3a: sign
H3b: column
H3c: base
LA: optical axis
LE, LS: line
PA, PB, PC: designated position
S1: pre-traveling position
S2: post-traveling position
T0: travel start time
T1, T2, T3: emission time
TA: shutter fully open period
TE: emission period
TR1: reading start period
TR2: reading end period
TS1: first traveling period
TS2: second traveling period

What is claimed is:

1. An imaging apparatus comprising:
an imaging element that has an imaging area for capturing an image of an object;
a shutter that generates a transition period for which a partial exposure region that is partially exposed in the imaging area is transferred over time in one direction from one end to the other end of the imaging area; and
an illumination control unit that, in a case in which at least first and second illuminating devices that irradiate the object with illumination light are provided, controls first and second emission times of the first and second illuminating devices and controls the first and second emission times to be different times within the transition period.

2. The imaging apparatus according to claim 1, wherein the shutter is a focal-plane shutter that is provided separately from the imaging element.

3. The imaging apparatus according to claim 2, wherein the shutter comprises a shutter front curtain and a shutter rear curtain that travel from the one end to the other end of the imaging area,
the transition period is a first traveling period for which the shutter front curtain travels from a fully closed position where the entire imaging area is shielded to a fully open position where the entire imaging area is exposed and a second traveling period for which the shutter rear curtain travels from the fully open position where the entire imaging area is exposed to the fully closed position where the entire imaging area is shielded, and
the illumination control unit controls the first and second emission times to be different times within the first traveling period or the second traveling period.

4. The imaging apparatus according to claim 1, wherein, in a case in which the imaging element is a CMOS image sensor, the shutter is an image reading unit that controls the imaging element such that an image signal is read by a rolling shutter method.

5. The imaging apparatus according to claim 4, wherein the shutter performs control such that charge accumulation and reading are sequentially performed from a line at the one end to a line at the other end of the imaging area,
the transition period is a reading start period from a start of the charge accumulation and reading for the line at the one end to a start of the charge accumulation and reading for the line at the other end of the imaging area and a reading end period from an end of the charge accumulation and reading for the line at the one end to an end of the charge accumulation and reading for the line at the other end of the imaging area, and
the illumination control unit controls the first and second emission times to be different times within the reading start period or the reading end period.

6. The imaging apparatus according to claim 1, wherein the shutter has a function of changing the transition period for which the partial exposure region is transferred.

7. The imaging apparatus according to claim 1, wherein the first and second illuminating devices include at least one of a built-in strobe device that is provided in an imaging apparatus body, an external strobe device that is attached to the imaging apparatus body, or an independent illuminating device that is independent of the imaging apparatus.

8. The imaging apparatus according to claim 1, further comprising:
a pre-image acquisition unit that directs the imaging element to perform a pre-imaging operation for capturing the image of the object in a state in which the first illuminating device or the second illuminating device emits light before a main imaging operation and acquires a pre-image;
an image display unit that displays the pre-image;
an operation input receiving unit that receives an input of an operation which designates any designated position of the pre-image in a state in which the pre-image is displayed on the image display unit; and
an emission time determination unit that determines the first and second emission times on the basis of the designated position designated by the operation input.

9. The imaging apparatus according to claim 8, wherein the operation input receiving unit is a touch panel that is provided so as to be stacked on the image display unit and is configured such that a touch operation is performed in a state in which the pre-image is displayed on the image display unit to designate the designated position.

10. A method for controlling an imaging apparatus comprising an imaging element that has an imaging area for capturing an image of an object, a shutter that generates a transition period for which a partial exposure region that is partially exposed in the imaging area is transferred over time in one direction from one end to the other end of the imaging area, and an illumination control unit that, in a case in which at least first and second illuminating devices that irradiate the object with illumination light are provided, controls first and second emission times of the first and second illuminating devices, the method comprising:
a transition period generation step of allowing the shutter to generate the transition period;
an illumination control step of allowing the illumination control unit to control the first and second emission times to be different times within the transition period; and
an imaging step of allowing the imaging element to capture the image of the object during the illumination control step.

* * * * *